(12) United States Patent
Kwak et al.

(10) Patent No.: US 11,343,041 B2
(45) Date of Patent: May 24, 2022

(54) METHOD AND DEVICE FOR SUPPORTING REPETITIVE CSI-RS RESOURCE TRANSMISSION IN MOBILE COMMUNICATION SYSTEM

(71) Applicant: Samsung Electronics Co., Ltd., Gyeonggi-do (KR)

(72) Inventors: Youngwoo Kwak, Gyeonggi-do (KR); Hoondong Noh, Gyeonggi-do (KR); Cheolkyu Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/881,647

(22) Filed: May 22, 2020

(65) Prior Publication Data

US 2020/0358573 A1 Nov. 12, 2020

Related U.S. Application Data

(63) Continuation of application No. 16/117,697, filed on Aug. 30, 2018, now Pat. No. 11,196,521.

(30) Foreign Application Priority Data

Aug. 31, 2017 (KR) .................. 10-2017-0111275

(51) Int. Cl.
  *H04L 5/00* (2006.01)
  *H04B 7/06* (2006.01)
  *H04W 72/04* (2009.01)

(52) U.S. Cl.
  CPC .......... *H04L 5/0048* (2013.01); *H04B 7/0626* (2013.01); *H04L 5/005* (2013.01); *H04W 72/04* (2013.01)

(58) Field of Classification Search
  CPC ....... H04L 5/0048; H04L 5/005; H04W 72/04
  See application file for complete search history.

(56) References Cited

U.S. PATENT DOCUMENTS 9,882,816 B2   1/2018  Xu et al.
10,999,745 B2 *  5/2021  Yang .................... H04B 7/0617
(Continued)

FOREIGN PATENT DOCUMENTS

WO   WO 2016/163843   10/2016

OTHER PUBLICATIONS

Intel Corporation, "Discussion on Control Signaling for DL Beam Management", R1-1712554, 3GPP TSG RAN WG1 Meeting #90, Aug. 21-25, 2017, 6 pages.
(Continued)

*Primary Examiner* — Redentor Pasia
(74) *Attorney, Agent, or Firm* — The Farrell Law Firm, P.C.

(57) ABSTRACT

The disclosure relates to a communication technique for convergence of a 5G communication system for supporting a higher data transmission rate beyond a 4G system with an IoT technology, and a system therefor. The disclosure may be applied to an intelligent service (e.g., smart home, smart building, smart city, smart car or connected car, health care, digital education, retail business, security- and safety-related service, etc.) on the basis of a 5G communication technology and an IoT-related technology. A method is provided for receiving a CSI-RS in a communication system. The method includes acquiring, by a UE, a configuration for a resource set including a resource set identifier, information for at least one CSI-RS resource, and repetition information, wherein a number of the at least one CSI-RS resource is up to a maximum number of CSI-RS resources per resource set, and the repetition information is set as either on or off; acquiring, by the UE from, a CSI-RS resource configuration per CSI-RS resource including a CSI-RS resource identifier, information for a number of CSI-RS ports, and information for an OFDM symbol for the CSI-RS, wherein the number (Continued)

of the CSI-RS ports of the at least one CSI-RS resource within the resource set is 1 or 2, and the at least one CSI-RS resource within the resource set is regarded to be transmitted in different OFDM symbols, in case that the repetition information is set as on; and transmitting CSI based on the configuration for the resource set.

20 Claims, 23 Drawing Sheets

(56) References Cited

U.S. PATENT DOCUMENTS

| | | | |
|---|---|---|---|
| 2013/0156120 | A1 | 6/2013 | Josiam et al. |
| 2014/0044044 | A1 | 2/2014 | Josiam |
| 2014/0286304 | A1* | 9/2014 | Yoon .................. H04B 7/0626 370/330 |
| 2016/0134352 | A1 | 5/2016 | Stirling |
| 2016/0192332 | A1 | 6/2016 | Koorapaty et al. |
| 2016/0218788 | A1* | 7/2016 | Yum .................. H04B 7/0626 |
| 2016/0285535 | A1* | 9/2016 | Kim .................. H04L 1/1671 |
| 2016/0353440 | A1* | 12/2016 | Lee .................. H04W 74/0833 |
| 2017/0288808 | A1* | 10/2017 | Blankenship ....... H04L 27/2607 |
| 2017/0302352 | A1* | 10/2017 | Islam .................. H04L 5/0048 |
| 2017/0331645 | A1 | 11/2017 | Baligh et al. |
| 2018/0027516 | A1 | 1/2018 | Han et al. |
| 2018/0034525 | A1 | 2/2018 | Park |
| 2018/0091280 | A1* | 3/2018 | Kim .................. H04L 5/0057 |
| 2018/0092129 | A1 | 3/2018 | Guo et al. |
| 2018/0102817 | A1* | 4/2018 | Park .................. H04B 7/04 |
| 2019/0028913 | A1* | 1/2019 | Park .................. H04B 7/0691 |
| 2019/0044669 | A1 | 2/2019 | Davydov et al. |
| 2019/0058517 | A1* | 2/2019 | Kang .................. H04L 5/0048 |
| 2019/0058561 | A1 | 2/2019 | Ho et al. |
| 2019/0068266 | A1 | 2/2019 | Chang et al. |
| 2019/0245603 | A1 | 8/2019 | Yum |
| 2019/0312668 | A1* | 10/2019 | Park .................. H04L 5/00 |
| 2019/0363778 | A1 | 11/2019 | Nilsson et al. |
| 2020/0036424 | A1 | 1/2020 | Kang et al. |
| 2020/0112355 | A1* | 4/2020 | Park .................. H04B 7/0626 |
| 2020/0112359 | A1* | 4/2020 | Park .................. H04L 5/0057 |
| 2020/0177256 | A1* | 6/2020 | Cha .................. H04L 5/0094 |
| 2020/0178279 | A1 | 6/2020 | Frenne et al. |
| 2020/0220583 | A1* | 7/2020 | Cha .................. H04L 5/0051 |
| 2020/0228180 | A1* | 7/2020 | Zhang .................. H04L 5/0023 |
| 2020/0252951 | A1 | 8/2020 | Frenne et al. |
| 2020/0383060 | A1* | 12/2020 | Park .................. H04W 52/242 |
| 2020/0389255 | A1* | 12/2020 | Harrison .............. H04L 1/0067 |

OTHER PUBLICATIONS

Huawei, HiSilicon, "General Framework for CSI Acquisition and Beam Management", R1-1712226, 3GPP TSG RAN WG1 Meeting #90, Aug. 21-25, 2017, 10 pages.
ZTE, "On CSI-RS for Beam Management", R1-1710194, 3GPP TSG RAN WG1 NR Ad-Hoc#2, Jun. 27-30, 2017, 10 pages.
Vivo, "On CSI-RS Design for Beam Management", R1-1710401, 3GPP TSG RAN WG1 Meeting NR Ad-Hoc#2, Jun. 27-30, 2017, 5 pages.
International Search Report dated Dec. 11, 2018 issued in counterpart application No. PCT/KR2018/010032, 3 pages.
Catt, "Discussion on CSI-RS for Beam Management", R1-1700229, 3GPP TSG RAN WG1 AH_NR Meeting, Jan. 16-20, 2017, 4 pages.
Huawei, HiSilicon, "CSI-RS Design for Beam Management", R1-1700069, 3GPP TSG RAN WG1 NR Ad-Hoc Meeting, Jan. 16-20, 2017, 7 pages.
Samsung, "Discussion on DL Beam Management Procedures P-2 and P-3", R1-1612509, 3GPP TSG RAN WG1 Meeting #87, Nov. 14-18, 2016, 4 pages.
Samsung, "CSI-RS for Beam Management", R1-1700927, 3GPP TSG RAN WG1 NR Ad Hoc, Jan. 16-20, 2017, 4 pages.
3GPP, 3rd Generation Partnership Project; Technical Specification Group Radio Access Network; Study on New Radio (NR) Access Technology, (Release 14), 3GPP TR 38.912 V1.0.0, Mar. 2017, 73 pages.
European Search Report dated Jun. 25, 2020 issued in counterpart application No. 18851565.4-1220, 11 pages.
U.S. Notice of Allowance dated Jul. 12, 2021 issued in counterpart U.S. Appl. No. 16/117,697, 17 pages.
U.S. Office Action dated Mar. 3, 2021 issued in counterpart U.S. Appl. No. 16/117,697, 18 pages.
U.S. Office Action dated Sep. 2, 2021 issued in counterpart U.S. Appl. No. 16/881,571, 27 pages.
U.S. Office Action dated Sep. 28, 2021 issued in counterpart U.S. Appl. No. 16/881,742, 68 pages.
U.S. Notice of Allowance dated Jan. 19, 2022 issued in counterpart U.S. Appl. No. 16/881,571, 14 pages.
ZTE, "On CSI-RS for Beam Management", R1-1712304, 3GPP TSG RAN WG1 Meeting #90, Aug. 21-25, 2017, 10 pages.
Vivo, "Beam Management and Beam Reporting", R1-1704488, 3GPP TSG RAN WG1 Meeting #88bis, Apr. 3-7, 2017, 7 pages.
Korean Office Action dated Apr. 4, 2022 issued in counterpart application No. 10-2017-0111275, 11 pages.

* cited by examiner 2D antenna port layout ($N_2>1$): 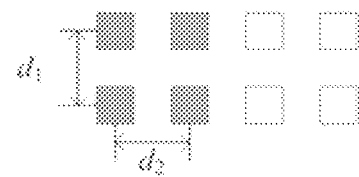
1D antenna port layout ($N_2=1$): 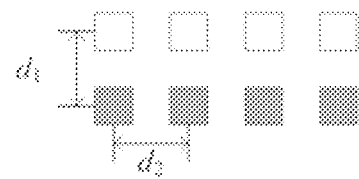
FIG. 23

METHOD AND DEVICE FOR SUPPORTING REPETITIVE CSI-RS RESOURCE TRANSMISSION IN MOBILE COMMUNICATION SYSTEM

CROSS-REFERENCE TO RELATED APPLICATION(S)

This application is a Continuation of U.S. application Ser. No. 16/117,697, which was filed in the U.S. Patent and Trademark Office on Aug. 30, 2018, and claims priority under 35 U.S.C. § 119(a) to Korean Patent Application Serial No. 10-2017-0111275, which was filed in the Korean Intellectual Property Office on Aug. 31, 2017, the entire disclosure of each of which is incorporated herein by reference.

BACKGROUND

1. Field

The disclosure relates, generally; to a wireless communication system, and more particularly, to a method and device for transmitting, by a base station, a channel state information reference signal (CSI-RS) for channel state measurement of a terminal.

2. Description of the Related Art

In order to meet wireless data traffic demands, which have increased since the commercialization of a 4G communication system, efforts to develop an improved 5G communication system or a pre-5G communication system have been made, which is sometimes referred to as a beyond-4G-network communication system or a post-long term evolution (LTE) system. In order to achieve a high data transmission rate, implementation of the 5G communication system in an mmWave band (e.g., a 60 GHz band) is being considered. In the 5G communication system, technologies such as beamforming, massive multiple-input multiple-output (MIMO), full-dimensional MIMO (FD-MIMO), array antenna, analog beamforming, and large-scale antenna technologies have been considered as a way to mitigate propagation path loss in the mmWave band and increase a propagation transmission distance. Further, in the 5G communication system, technologies such as an evolved small cell, an advanced small cell, a cloud radio access network (RAN), an ultra-dense network, device-to-device communication (D2D), a wireless backhaul, a moving network, cooperative communication, coordinated multi-points (CoMP), and received interference cancellation have been used to improve the system network. In addition, in the 5G system, advanced coding modulation (ACM) schemes, such as hybrid frequency-shift keying (FSK) and quadrature amplitude modulation (QAM) (FQAM) and sliding window superposition coding (SWSC), and advanced access technologies, such as filter bank multi carrier (FBMC), non-orthogonal multiple access (NOMA), and sparse code multiple access (SCMA), have also been developed.

The Internet has evolved to an Internet of things (IoT) network, in which distributed components, such as objects, exchange and process information from a human-oriented connection network in which humans generate and consume information. Internet of everything (IoE) technology, in which big-data-processing technology based on a connection with a cloud server or the like is combined with IoT technology, has also emerged. In order to implement the IoT, technical factors such as a sensing technique, wired/wireless communication and network infrastructure, service interface technology, and security technology are required, and thus research is being conducted these days on a sensor network, machine-to-machine (M2M) communication, machine-type communication (MTC), and the like for connection between objects. In an IoT environment, through collection and analysis of data generated by connected objects, an intelligent internet technology (IT) service that creates new value in people's lives may be provided. The IoT may be applied to fields, such as those of a smart home, a smart building, a smart city, a smart car, a connected car, a smart grid, health care, a smart home appliance, or high-tech medical services, through the convergence or combination of the conventional information technology (IT) and various industries.

Accordingly, various attempts to apply 5G communication to an IoT network have been made. For example, 5G communication technologies such as a sensor network, M2M communication, and MTC are implemented using techniques such as beamforming, MIMO, and array antennas. The application of a cloud RAN as big-data-processing technology is an example of convergence of the 5G technology and the IoT technology.

In new 5G communication, that is, the new radio (NR), communication is performed based on beams, unlike the existing LTE; this is because NR supports a band higher than 6 GHz, which is higher than the conventional LTE band. Further, since there are not many conventionally used systems in such a band, more band can be secured. However, in order to support a band higher than 6 GHz, in addition to those affecting the use of bands in existing LTE, path loss due to the increase of the band also needs to be considered. For example, as a band used for wireless communication increases, path loss occurring in the corresponding band also increases. Further, due to the pass loss, the coverage supported by a corresponding base station decreases for the same transmission power. Therefore, in order to overcome the pass loss, it is necessary to support a beam for concentration and transmission of transmission power in the direction required by the base station, and since a direction that can be supported by one beam is reduced according to the support of the corresponding beam, it is also necessary to efficiently select and manage the beam.

SUMMARY

The disclosure has been made to address at least the disadvantages described above and to provide at least the advantages described below. Accordingly, the disclosure provides a method and device for efficiently selecting and managing a beam.

In accordance with an aspect of the disclosure, a method is provided for receiving a channel state information reference signal (CSI-RS) in a communication system. The method includes acquiring, by a user equipment (UE), from a base station, a configuration for a resource set including a resource set identifier, information for at least one CSI-RS resource, and repetition information, wherein a number of the at least one CSI-RS resource is up to a maximum number of CSI-RS resources per resource set, and wherein the repetition information is set as either on or off; acquiring, by the UE from, the base station, a CSI-RS resource configuration per CSI-RS resource including a CSI-RS resource identifier, information for a number of CSI-RS ports, and information for an orthogonal frequency division multiplexing (OFDM) symbol for the CSI-RS, wherein the number of the CSI-RS ports of the at least one CSI-RS resource within the resource set is 1 or 2, and wherein the at least one CSI-RS resource within the resource set is regarded to be transmitted in different OFDM symbols, in case that the repetition information is set as on; and transmitting, to the base station, channel state information (CSI) based on the configuration for the resource set.

In accordance with an aspect of the disclosure, a method is provided for transmitting a channel state information reference signal (CSI-RS) in a communication system. The method includes transmitting, by a base station, to a user equipment (UE), a CSI-RS resource configuration per CSI-RS resource including a CSI-RS resource identifier, information for a number of CSI-RS ports, and information for an orthogonal frequency division multiplexing (OFDM) symbol for the CSI-RS; transmitting, by the base station, to the UE, a configuration for a resource set including a resource set identifier, information for at least one CSI-RS resource within the resource set, and repetition information, wherein a number of the at least one CSI-RS resource is up to a maximum number of CSI-RS resources per resource set, wherein the repetition information is set as either on or off, wherein the number of the CSI-RS ports of the at least one CSI-RS resource within the resource set is 1 or 2, and wherein the at least one CSI-RS resource within the resource set is regarded to be transmitted in different OFDM symbols, in case that the repetition information is set as on; and receiving, from the UE, channel state information (CSI) based on the configuration for the resource set.

In accordance with an aspect of the disclosure, a user equipment (UE) is provided for receiving a channel state information reference signal (CSI-RS) in a communication system. The UE includes a transceiver; and a controller coupled with the transceiver and configured to acquire, from a base station, a configuration for a resource set including a resource set identifier, information for at least one CSI-RS resource, and repetition information, wherein a number of the at least one CSI-RS resource is up to a maximum number of CSI-RS resources per resource set, and wherein the repetition information is set as either on or off, acquire, from the base station, a CSI-RS resource configuration per CSI-RS resource including a CSI-RS resource identifier, information for a number of CSI-RS ports, and information for an orthogonal frequency division multiplexing (OFDM) symbol for the CSI-RS, wherein the number of the CSI-RS ports of the at least one CSI-RS resource within the resource set is 1 or 2, and wherein the at least one CSI-RS resource within the resource set is regarded to be transmitted in different OFDM symbols, in case that the repetition information is set as on, and transmit, to the base station, channel state information (CSI) based on the configuration for the resource set.

In accordance with an aspect of the disclosure, a base station is provided for transmitting a channel state information reference signal (CSI-RS) in a communication system. The base station includes a transceiver; and a controller coupled with the transceiver and configured to transmit, to a user equipment (UE), a CSI-RS resource configuration per CSI-RS resource including a CSI-RS resource identifier, information for a number of CSI-RS ports, and information for an orthogonal frequency division multiplexing (OFDM) symbol for the CSI-RS, transmit, to the UE, a configuration for a resource set including a resource set identifier, information for at least one CSI-RS resource within the resource set, and repetition information, wherein a number of the at least one CSI-RS resource is up to a maximum number of CSI-RS resources per resource set, wherein the repetition information is set as either on or off, wherein the number of the CSI-RS ports of the at least one CSI-RS resource within the resource set is 1 or 2, and wherein the at least one CSI-RS resource within the resource set is regarded to be transmitted in different OFDM symbols, in case that the repetition information is set as on, and receive, from the UE, channel state information (CSI) based on the configuration for the resource set.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 23 illustrates a beam group (B) pattern according to an embodiment.

DETAILED DESCRIPTION

Figure 1:
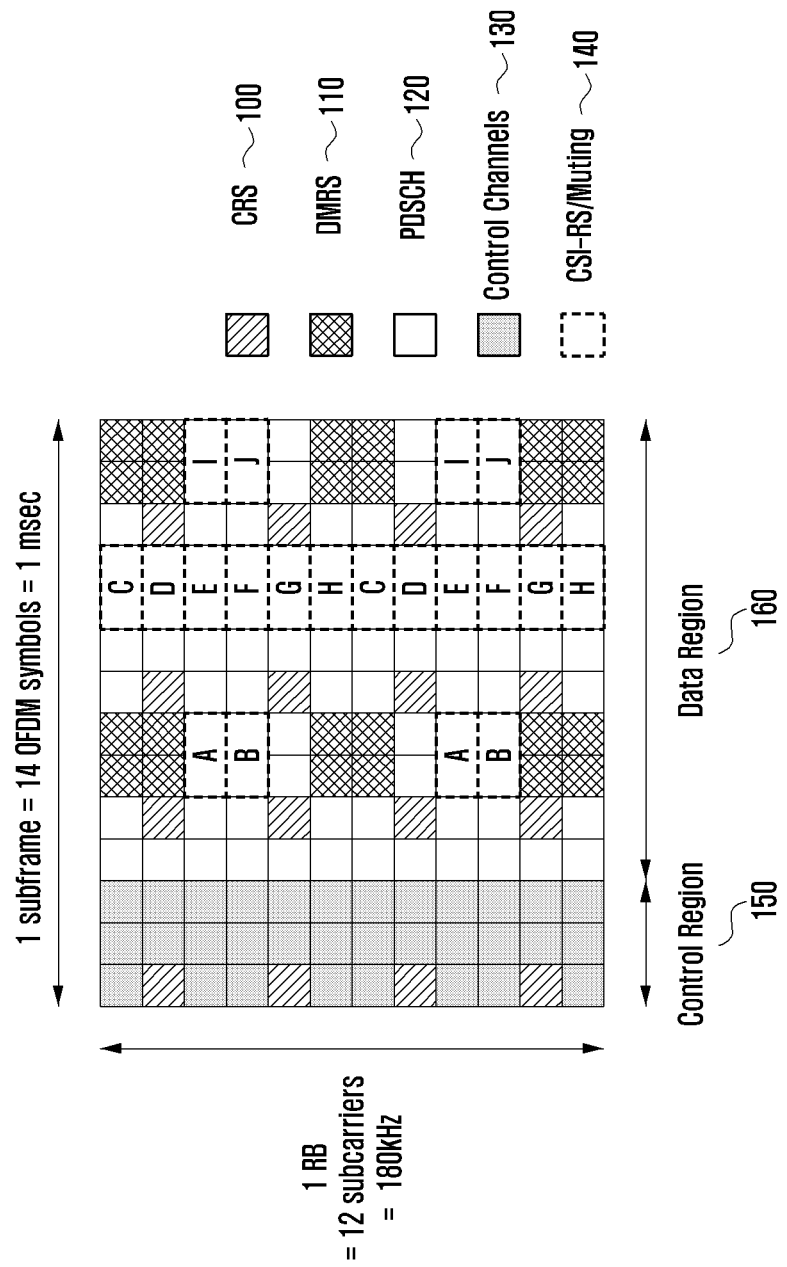
FIG. 1 is a diagram of a radio resource setting, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices and may include an electronic device according to the development of new technology.

Although the disclosure provides descriptions of an NR system, an LTE system, and an LTE-advanced (LTE-A) system, the disclosure may be applied to a communication system having a structure similar to that of the above systems and other communication systems using a licensed band and an unlicensed band, without any modification thereto. The disclosure relates to a general wireless mobile communication system, and more particularly to a method for mapping a reference signal in a wireless mobile communication system employing a multiple-access scheme using multiple carriers, such as orthogonal frequency-division multiple access (OFDMA).

A mobile communication system has evolved into a high-speed, high-quality wireless packet data communication system to provide data and multimedia services. To this end, various standardization organizations, such as 3GPP, 3GPP2, IEEE, and the like, have been working on standardization of the 3rd evolved mobile communication system to which a multiple-access scheme that uses multiple carriers can be applied. Recently, various mobile communication standards such as LTE of 3GPP, ultra mobile broadband (UMB) of 3GPP2, 802.16m of IEEE, and the like have been developed to support a high-speed and high-quality wireless packet data communication system based on the multiple-access scheme using multiple carriers.

Existing third-generation mobile communication system, such as LTE, UMB, and 802.16m, are based on a multi-carrier multiple access scheme. In order to improve transmission efficiency, such systems employ MIMO, multiple antennas and use a variety of technologies, such as a beamforming method, an AMC method, and a channel-sensitive scheduling method. The various technologies may enhance transmission efficiency and improve system capacity performance through a method of concentrating transmission power that is transmitted from multiple antennas or adjusting the amount of transmitted data, based on channel quality or the like, and selectively transmitting, to a user, data having a good channel quality, or the like. Most of these schemes are operated based on channel state information of a channel between a base station (BS), or g Node B (gNB), and a terminal (user equipment (UE) or mobile station (MS)), and thus the gNB or the UE may need to measure a channel state between the base station and the terminal. A channel state information reference signal (CSI-RS) can be used. The above-mentioned gNB relates to a downlink transmission/uplink reception device located at a predetermined place, and one gNB performs transmission and reception for a plurality of cells. In one mobile communication system, a plurality of gNBs can be geographically dispersed, and each gNB can perform transmission and reception for a plurality of cells.

Existing 3rd and 4th generation mobile communication systems, such as, LTE, LTE-A, and the like, utilize MIMO technology, which executes transmission using a plurality of transmitting and receiving antennas to improve the data transmission rate and the system capacity. The MIMO technology uses a plurality of transceiving antennas and may execute transmission by spatially dividing a plurality of information streams. Transmission through spatially dividing the plurality of information streams is referred to as spatial multiplexing. Generally, the number of information streams to which spatial multiplexing is to be applied may vary based on the number of antennas included in a transmitter and a receiver. The number of information streams to which spatial multiplexing is to be applied is typically referred to as the rank of a corresponding transmission. When the MIMO technology is supported by the LTE-A Release 11 standards, spatial multiplexing is supported for 16 transmission antennas or 8 reception antennas, and up to 8 ranks are supported.

In the case of NR access technology, that is, a 5th-generation mobile communication system currently under discussion, the purpose of the system design is to support various services, such as an eMBB, an mMTC, and an URLLC. In the NR system, time and frequency resources are configured to be flexibly transmitted by enabling transmission of a reference signal, which has conventionally been constantly transmitted, to be minimized and aperiodically performed.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 illustrates a radio resource of one subframe and one resource block (RB), which is a minimum unit for downlink scheduling in the LTE system, according to an embodiment.

The radio resource illustrated in FIG. 1 is formed of a single subframe on a time axis and a single RB on a frequency axis. The radio resource is formed of 12 subcarriers in the frequency domain, and 14 OFDM symbols in the time domain, and thus, may have a total of 168 unique frequency and time locations. In LTE, each unique frequency and time location of FIG. 1 is referred to as a resource element (RE).

Through the radio resource illustrated in FIG. 1, a plurality of different types of signals may be transmitted as follows.

1. Cell-specific RS (CRS) 100: The CRS is a reference signal periodically transmitted for all terminals belonging to one cell, and may be commonly used by a plurality of terminals.

2. Demodulation reference signal 110 (DMRS): The DMRS is a reference signal transmitted for a specific terminal, and is transmitted only when data is transmitted to a corresponding terminal. The DMRS is formed of a total of 8 DMRS ports. In LTE/LTE-A, ports from port 7 to port 14 are DMRS ports and ports maintain orthogonality therebetween in order to prevent the generation of interference therebetween using code division multiplexing (CDM) or frequency division multiplexing (FDM).

3. Physical downlink shared channel 120 (PDSCH): The PDSCH is a data channel for downlink transmission and is used for a base station to transmit traffic to a terminal. The PDSCH is transmitted using the RE, in which a reference signal is not transmitted in the data region 160 of FIG. 1.

4. CSI-RS 140: The CSI-RS is used to measure the channel state of a reference signal transmitted for terminals belonging to one cell. A plurality of CSI-RSs may be transmitted in a single cell.

5. Other control channels 130 (physical hybrid ARQ indicator channel (PHICH), physical control format indicator channel (PCFICH), and physical downlink control channel (PDCCH)): Control channels are used for providing control information necessary for reception of a physical downlink shared channel (PDSCH) by a terminal or for transmitting an acknowledgement/negative acknowledgment (ACK/NACK) for operation of hybrid automatic repeat request (HARQ) with respect to uplink data transmission. Transmission is performed in a control region 150.

In addition to the signal, in the LTE system, muting may be set so that terminals in a corresponding cell may receive a CSI-RS that is transmitted from another base station without interference. Muting may be applied to a location where the CSI-RS may be transmitted, and generally, the terminal may skip the corresponding radio resources and receive a traffic signal. In the LTE-A system, muting is also referred to as zero-power CSI-RS, due to the characteristics of muting, muting is applied to the location of the CSI-RS and transmission power is not transmitted.

In FIG. 1, a CSI-RS may be transmitted using some of the locations expressed as A, B, C, D, E, F, G, H, I, and J based on a number of antennas that transmit a CSI-RS. Also, muting may be applied to some of the locations expressed as A, B, C, D, E, F, G, H, I, and J. Particularly, a CSI-RS may be transmitted using 2, 4, and 8 REs, based on the number of antenna ports that execute transmission. For example, when the number of antenna ports is 2, a CSI-RS is transmitted through half of a predetermined pattern in FIG. 1. When the number of antenna ports is 4, a CSI-RS is transmitted through all of a predetermined pattern. When the number of antennas ports is 8, a CSI-RS is transmitted using two patterns. Conversely, muting is always executed based on a single pattern. That is, muting may be applied to a plurality of patterns, but may not be applied to a portion of a single pattern when the location does not overlap a CSI-RS. However, when the location of muting and the location of a CSI-RS overlap, muting may be applied to a portion of a single pattern.

When a CSI-RS is transmitted with respect to two antenna ports, the CSI-RS may transmit signals of respective antenna ports through two REs that are consecutive in the time axis, and the signal of each antenna port is distinguished by an orthogonal code. When a CSI-RS is transmitted with respect to four antenna ports, two more REs are used in addition to the CSI-RS for two antenna ports, and the signals for the two antenna ports are additionally transmitted in the same manner. Likewise, the transmission of a CSI-RS associated with 8 antenna ports may be executed. When a CSI-RS supporting 12 antenna ports and 16 antenna ports, three CSI-RS transmission locations pertaining to four existing antenna ports are combined, or two CSI-RS transmission locations pertaining to eight antenna ports can be combined.

The terminal may receive allocation of CSI-IM (or interference measurement resources (IMR)) together with the CSI-RS, in which the CSI-IM resource has the same resource structure and location as those of the CSI-RS supporting the 4 ports. The CSI-IM is a resource for accurately measuring interference from an adjacent base station by a terminal that receives data from one or more base stations. For example, when the terminal wants to measure the amount of interference when an adjacent base station transmits data and the amount of interference when an adjacent base station does not transmit data, the base station may include a CSI-RS and two CSI-IM resources. The adjacent base station is configured to always transmit a signal in one CSI-IM, while the adjacent base station is prevented from always transmitting a signal in the other CSI-IM, so that the amount of interference of the adjacent base station may be effectively measured.

Table 1 described below shows a radio resource control (RRC) field for configuring a CSI-RS configuration. Particularly, Table 1 shows an RRC configuration for supporting a periodic CSI-RS within the CSI process.

TABLE 1

| CSI-RS config | CSI-IM config | CQI report config | Etc. |
| --- | --- | --- | --- |
| Number of antenna ports resource config: time and frequency position in a subframe subframe config: periodicity and subframe offset QCL-CRS-info(QCL type B): CRS information for CoMP | resource config: time and frequency position in a subframe subframe config: periodicity and subframe offset | periodic: mode, resource, periodicity, offset etc. aperiodic: mode etc. PMI/RI report RI reference CQI process subframepattern | Pc codebook subset restriction |

Configuring channel state reporting based on a periodic CSI-RS in a CSI process may be classified into four types, as shown in Table 1. CSI-RS config is for configuring frequency and time positions of a CSI-RS RE. The number of ports that the corresponding CSI-RS has is configured by configuring the number of antennas. Resource config configures an RE position within an RB, and Subframe config configures a period and an offset of a subframe. Table 2 is a table for configuring Resource config and Subframe config, which are currently supported by LTE.

TABLE 2

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| Frame structure type 2 only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 |  |  |
|  | 20 | (4, 1) | 1 | (4, 1) | 1 |  |  |
|  | 21 | (3, 1) | 1 |  | 1 |  |  |
|  | 22 | (8, 1) | 1 |  |  |  |  |
|  | 23 | (7, 1) | 1 |  |  |  |  |
|  | 24 | (6, 1) | 1 |  |  |  |  |
|  | 25 | (2, 1) | 1 |  |  |  |  |
|  | 26 | (1, 1) | 1 |  |  |  |  |
|  | 27 | (0, 1) | 1 |  |  |  |  |

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

The terminal is capable of checking frequency and time positions, a period, and an offset via Table 2 and Table 3. Quasi-colocated (Qcl)-CRS-info configures quasi co-position information for coordinated multi-point (CoMP). CSI-IM config is for configuring frequency and time positions of CSI-IM for interference measurement. Since CSI-IM is always configured based on 4 ports, it is not necessary to configure the number of antenna ports, and Resource config and Subframe config are configured in the same way as CSI-RS. CQI report config exists to configure how to report a channel state, by using a corresponding CSI process. Periodic CSI reporting setting, aperiodic CSI reporting setting, PMI/RI report setting, RI reference CSI process configuration, subframe pattern configuration, and the like are also included.

For interference measurement and channels received by the terminal, a subframe pattern is for configuring a measurement subframe subset for supporting interference measurement and a channel having different temporal characteristics. The measurement subframe subset was first introduced for the enhanced inter-cell interference coordination (eICIC) to employ other interference characteristics of an almost-blank subframe (ABS) and a non-ABS general subframe so as to perform estimation. The measurement subframe subset was developed into a form that enables measurement by configuring two IMRs in order to measure different channel characteristics between a subframe that is dynamically switchable from downlink to uplink and a subframe that always operates as downlink in enhanced interference mitigation and traffic adaptation (eIMTA). Tables 4 and 5 show the measurement subframe subset for supporting eICIC and eIMTA.

TABLE 4

| CQI-ReportConfig-r10 ::= SEQUENCE { | |
|---|---|
| cqi-ReportAperiodic-r10 OPTIONAL, -- Need ON | CQI-ReportAperiodic-r10 |
| nomPDSCH-RS-EPRE-Offset | INTEGER (−1..6), |
| cqi-ReportPeriodic-r10 OPTIONAL, -- Need ON | CQI-ReportPeriodic-r10 |
| pmi-RI-Report-r9 OPTIONAL, -- Cond PMIRIPCell | ENUMERATED {setup} |
| csi-SubframePatternConfig-r10 | CHOICE { |
| release | NULL, |
| setup | SEQUENCE { |
| csi-MeasSubframeSet1-r10 | MeasSubframePattern-r10, |
| csi-MeasSubframeSet2-r10 | MeasSubframePattern-r10 |

TABLE 4-continued

```
        }
    }                          OPTIONAL --
Need ON
}
```

TABLE 5

```
CQI-ReportConfig-v1250 ::=      SEQUENCE {
    csi-SubframePatternConfig-r12       CHOICE {
        release                 NULL,
        setup                   SEQUENCE {
            csi-MeasSubframeSets-r12            BIT STRING (SIZE (10))
        }
    }                                           OPTIONAL, -- Need
ON
    cqi-ReportBoth-v1250                CQI-ReportBoth-v1250    OPTIONAL,
    -- Need ON
    cqi-ReportAperiodic-v1250   CQI-ReportAperiodic-v1250   OPTIONAL, --
Need ON
    altCQI-Table-r12            ENUMERATED {
                                allSubframes, csi-SubframeSet1,
                                csi-SubframeSet2, spare1}  OPTIONAL  --
Need OP
}
```

An eICIC measurement subframe subset supported by LTE is configured using csi-MeasSubframeSet1-r10 and csi-MeasSubframeSet2-r10. MeasSubframePattern-r10 referred to by a corresponding field is shown in Table 6 set forth below.

TABLE 6

```
--ASN1 START
MeasSubframePattern-r10 ::= CHOICE {
    subframePatternFDD-r10      BIT STRING (SIZE (40)),
    subframePatternTDD-r10      CHOICE {
        subframeConfig1-5-r10       BIT STRING (SIZE (20)),
        subframeConfig0-r10         BIT STRING (SIZE (70)),
        subframeConfig6-r10         BIT STRING (SIZE (60)),
        ...
    },
    ...
}
--ASN1STOP
```

Most significant bit (MSB) on the left in the field indicates subframe #0, and when a bit value is 1, it is indicated that a corresponding subframe is included in a measurement subframe subset. Unlike the eICIC measurement subframe subset, in which subframe sets are configured through respective fields, in the eIMTA measurement subframe set using a single field, a bit value of 0 indicates that a corresponding subframe is included in a first subframe set, and a bit value of 1 indicates that a corresponding subframe is included in a second subframe set. Therefore, there is a difference in that, in the eICIC, corresponding subframes may not be included in two subframe sets, but in the eIMTA subframe set, corresponding subframes should always be included one of two subframe sets.

In addition, there is a power ratio between a PDSCH and a CSI-RS RE (which is referred to as $P_C$) which is required for a terminal to generate a channel state report, and codebook subset restriction for configuring which codebook is to be used. $P_C$ and codebook subset restriction are configured by a p-C-AndCBSRList field including two P-C-AndCBSR fields shown in Table 8 in a list form, and each field refers to a configuration for each subframe subset.

TABLE 7

```
CSI-Process-r11 ::=     SEQUENCE {
    ...
    p-C-AndCBSRList-r11     SEQUENCE (SIZE (1..2)) OF P-C-AndCBSR-r11,
    ...
}
```

TABLE 8

```
P-C-AndCBSR-r11 ::=     SEQUENCE {
    p-C-r11                             INTEGER (-8..15),
    codebookSubsetRestriction-r11       BIT STRING
}
```

$P_C$ may be defined by the mathematical Equation (1) below, and a value between −8 and 15 dB may be specified.

$$P_C = \frac{PDSCH\ EPRE}{CSI-RS\ EPRE} \quad (1)$$

The base station may variably adjust CSI-RS transmission power for various purposes, such as improving a channel estimation accuracy etc., and the terminal may figure out how low or high the transmission power to be used for data transmission is, compared with the transmission power used for channel estimation, using the provided $P_C$. Even if the base station varies the CSI-RS transmission power, the terminal may be able to calculate an accurate CQI and report the calculated CQI to the base station.

In a cellular system, the base station should transmit a reference signal to the terminal in order to measure a downlink channel state. In the LTE system of the 3GPP, the terminal measures a channel state between the base station and the terminal by using a CSI-RS or a CRS transmitted by the base station. In association with the channel state, several factors need to be fundamentally considered, and the amount of interference in a downlink may be included therein. The amount of interference in a downlink may include an interference signal generated by an antenna that belongs to an adjacent base station's thermal noise, and the like, which is important when a terminal determines the channel state of the downlink.

When a base station having one transmission antenna transmits a signal to a terminal having one reception antenna, the terminal may have to determine the amount of energy per symbol and the amount of interference in order to determine an interference-to-symbol energy ratio (Es/Io), wherein the amount of energy per symbol is received in the downlink by using a reference signal received from the base station, and the amount of interference is to be concurrently received in intervals for reception of corresponding symbols. The determined Es/Io is converted into a data transmission rate or a value corresponding thereto, and is provided to the base station in the form of a CQI, so that the base station may determine the data transmission rate at which to perform transmission to the terminal.

In the case of the LTE system, the terminal feeds back information associated with a channel state of a downlink to the base station, so that the base station utilizes the same for downlink scheduling. That is, the terminal measures a reference signal transmitted in the downlink by the base station, and feeds back information extracted therefrom to the base station in a form defined by the LTE standard. There are three major types of information that the terminal feeds back in LTE.

RI: The number of spatial layers that the terminal may receive in the current channel state.

Precoder matrix indicator (PMI): An indicator for a precoding matrix preferred by the terminal in the current channel state.

CQI: The maximum data rate that the terminal may receive in the current channel state. The CQI may be replaced with a signal-to-interference plus noise ratio (SINR) that may be utilized similar to the maximum data rate, a maximum error correction-coding rate, a modulation scheme, data efficiency per frequency, and the like.

The RI, PMI, and CQI are interrelated. For example, a precoding matrix supported in LTE/LTE-A may be defined to be different for each rank. Therefore, a PMI value when the RI has a value of 1 and a PMI value when the RI has a value of 2 are interpreted differently even if the values thereof are the same. Also, when the terminal determines the CQI, it is assumed that the PMI value and the rank value that the terminal itself has provided to the base station are applied to the base station. That is, when the terminal provides RI_X, PMI_Y, and CQI_Z to the base station, the terminal may receive data at a data transmission rate corresponding to CQI_Z when the rank is RI_X and precoding is PMI_Y. When the terminal calculates a CQI, the terminal assumes the transmission scheme to be executed with respect to the base station so that the terminal may obtain optimal performance when the terminal actually executes transmission using the corresponding transmission scheme.

In LTE, periodic feedback of a terminal may be configured to one of the following four feedback modes (or reporting modes), based on information that is included.

Reporting mode 1-0 (wideband CQI with no PMI): RI, broadband (wideband) CQI (wCQI)

Reporting mode 1-1 (wideband CQI with single PMI): RI, wCQI, PMI

Reporting mode 2-0 (subband CQI with no PMI): RI, wCQI, narrowband (subband) CQI (sCQI)

Reporting mode 2-1 (subband CQI with single PMI): RI, wCQI, sCQI, PMI

The feedback timing of each piece of information for the four feedback modes is determined by a value, such as $N_{pd}$, $N_{OFFSET,\ CQI}$, $M_{RI}$, and $N_{OFFSET,\ RI}$, transmitted through a higher-layer signal. In feedback mode 1-0, the transmission period of a wCQI is $N_{pd}$, and feedback timing may be determined based on a subframe offset value of $N_{OFFSET,\ CQI}$. Further, the transmission period of RI is $N_{pd} \cdot N_{RI}$, and an offset is $N_{OFFSET,\ CQI} + N_{OFFSET,\ RI}$.

Figure 2:
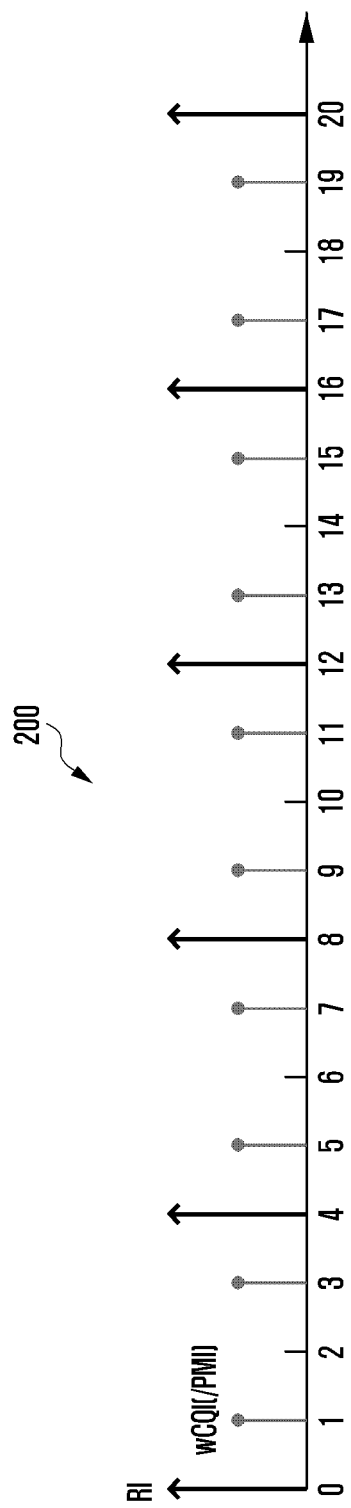
FIG. 2 is a diagram of feedback timing of rank indicator (RI) and wideband channel quality indicator (wCQI) when $N_{pd}=2$, $M_{RI}=2$, $N_{OFFSET, CQI}=1$, and NOFFSET, RI=−1, according to an embodiment.

FIG. 2 is a diagram of feedback timing 200 of RI and wCQI when $N_{pd}=2$, $M_{RI}=2$, $N_{OFFSET,\ CQI}=1$, and $N_{OFFSET,\ RI}=-1$, according to an embodiment. In FIG. 2, each timing indicates a subframe index.

Although feedback mode 1-1 has the same feedback timing as that of mode 1-0, it is different in that a wCQI is transmitted together with a PMI at a wCQI transmission timing.

In feedback mode 2-0, a feedback period for sCQI is $N_{pd}$ and an offset value is $N_{OFFSET,\ CQI}$. Further, a feedback period for wCQI is $H \cdot N_{pd}$, and an offset value is $N_{OFFSET,\ CQI}$, which is the same as that of sCQI. Here, H=J·K+1, in which K is transmitted through a higher-layer signal, and J is a value determined by a system bandwidth.

A value of J with respect to a 10 MHz system is defined as 3. Accordingly, a wCQI is transmitted every H transmissions of an sCQI, instead of the sCQI. The period of an RI corresponds to $M_{RI} \cdot H \cdot N_{pd}$ subframes, and the offset thereof is $N_{OFFSET,CQI} + N_{OFFSET,RI}$.

Figure 3:
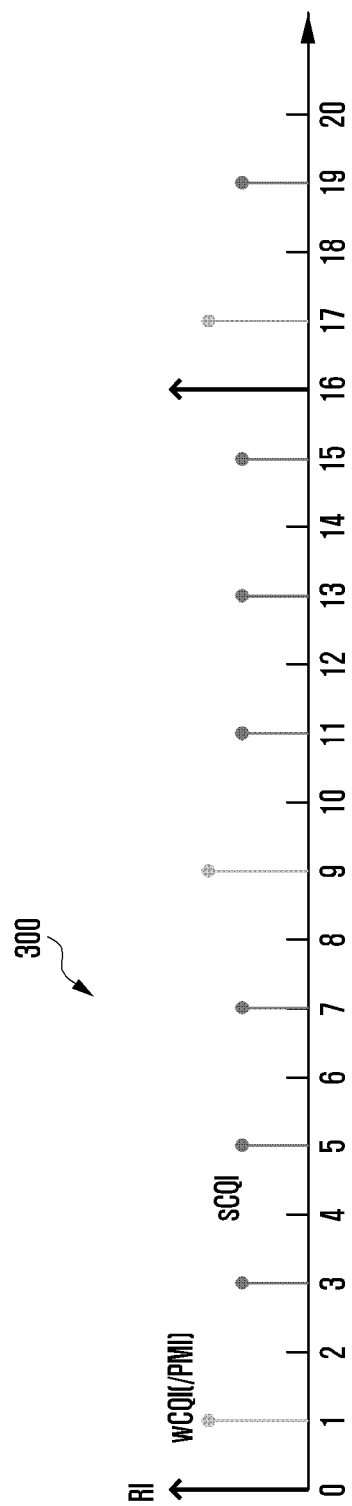
FIG. 3 is a diagram of feedback timing of RI, subband CQI (sCQI), and wCQI when $N_{pd}=2$, $M_{RI}=2$, J=3(10 MHz), K=1, $N_{OFFSET, CQI}=1$, and $N_{OFFSET, RI}=-1$, according to an embodiment.

FIG. 3 is a diagram of feedback timing 300 of RI, sCQI, and wCQI when $N_{pd}=2$, $M_{RI}=2$, J=3 (10 MHz), K=1, $N_{OFFSET,\ CQI}=1$, and $N_{OFFSET,\ RI}=-1$, according to an embodiment.

Although feedback mode 2-1 has the same feedback timing as that of mode 2-0, it is different in that a wCQI is transmitted together with a PMI at a wCQI transmission timing.

The above-described feedback timing corresponds to when the number of CSI-RS antenna ports is less than or equal to 4. When a terminal is assigned with a CSI-RS associated with 8 antenna ports, two types of PMI information need to be fed back, unlike the feedback timing. Feedback mode 1-1 with respect to 8 CSI-RS antenna ports is divided into two submodes. In a first submode, an RI is transmitted together with first PMI information, and second PMI information is transmitted together with a wCQI. A feedback period and an offset with respect to the wCQI and the second PMI are defined as $N_{pd}$, $N_{OFFSET, CQI}$, and a feedback period and an offset value for the RI and the first PMI information are defined as $M_{RI} \cdot N_{pd}$, $N_{OFFSET, CQI} + N_{OFFSET, RI}$, respectively. Here, when a precoding matrix corresponding to the first PMI is $W_1$ and a precoding matrix corresponding to the second PMI is $W_2$, a terminal and a base station share information indicating that the precoding matrix preferred by the terminal is determined to be $W_1 * W_2$.

When feedback mode 2-1 is for eight CSI-RS antenna ports, feedback of precoding type indicator (PTI) information is added. PTI is fed back with RI, and a period thereof corresponds to $M_R I \cdot H \cdot N_{pd}$, and an offset thereof is defined as $N_{OFFSET, CQI} + N_{OFFSET, RI}$. When the PTI is 0, a first PMI, a second PMI, and a wCQI are all fed back. The wCQI and the second PMI are transmitted together at an identical timing, the period is $N_{pd}$, and an offset is $N_{OFFSET, CQI}$. Also, the period of the first PMI corresponds to $H' \cdot N_{pd}$, and the offset is $N_{OFFSET, CQI}$. Here, H' is transmitted through a higher-layer signal. Conversely, when the PTI is 1, the PTI is transferred together with an RI, and wCQI and a second PMI are transmitted together, and sCQI is additionally fed back at another timing. The first PMI is not transmitted. The period and offset of the PTI and the RI are identical to the case in which the PTI is 0, and the sCQI is defined to have a period of $N_{pd}$ and an offset of $N_{OFFSET, CQI}$. Also, the wCQI and the second PMI are fed back with a period of $H \cdot N_{pd}$ and an offset of $N_{OFFSET, CQI}$. H is identical to when the number of CSI-RS antenna ports is 4.

Figure 4:
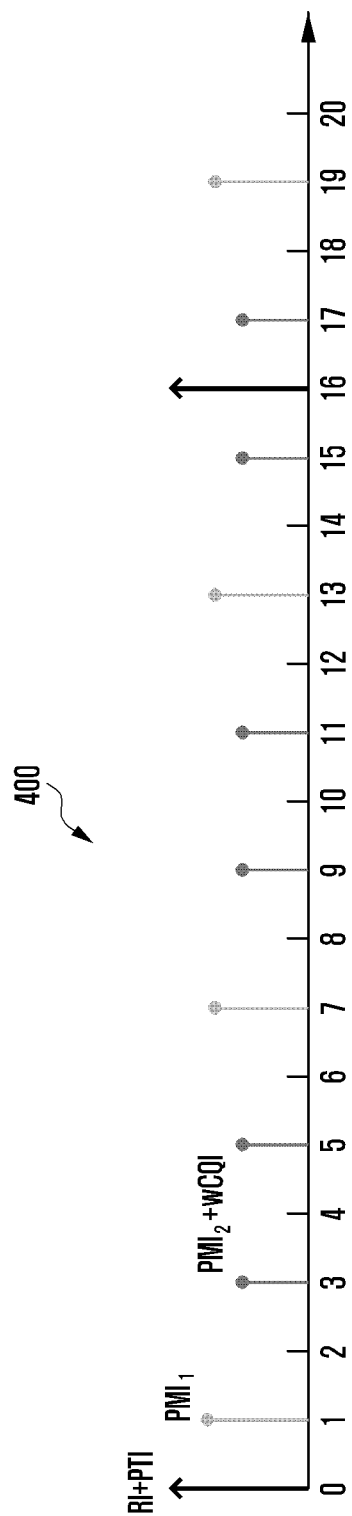
FIG. 4 is a of feedback timing when precoding type indicator (PTI)=0 and $N_{pd}=2$, $M_{RI}=2$, J=3(10 MHz), K=1, H'=3, $N_{OFFSET, CQI}=1$, and $N_{OFFSET, RI}=-1$, according to an embodiment.

FIG. 4 is a diagram of feedback timing 400 when PTI=0 and $N_{pd}$=2, $M_{RI}$=2, J=3 (10 MHz), K=1, H'=3, $N_{OFFSET, CQI}$=1, and $N_{OFFSET, RI}$=−1, according to an embodiment.

Figure 5:
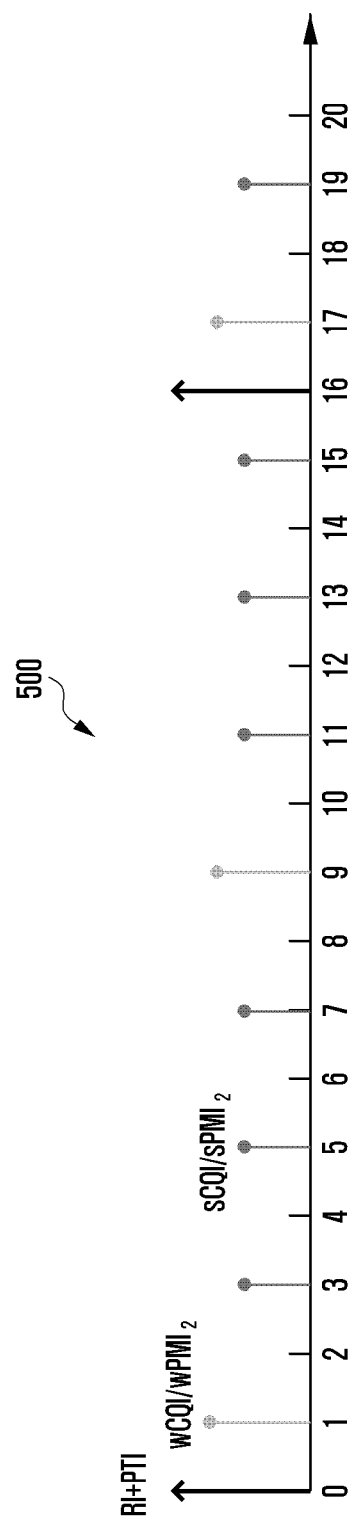
FIG. 5 is a diagram of feedback timing when PTI=1 and $N_{pd}=2$, $M_{RI}=2$, J=3(10 MHz), K=1, H'=3, $N_{OFFSET, CQI}=1$, and $N_{OFFSET, RI}=-1$, according to an embodiment.

FIG. 5 is a diagram of feedback timing 500 when PTI=1 and $N_{pd}$=2, $M_{RI}$=2, J=3 (10 MHz), K=1, H'=3, $N_{OFFSET, CQI}$=1, and $N_{OFFSET, RI}$=−1, according to an embodiment.

Figure 6:
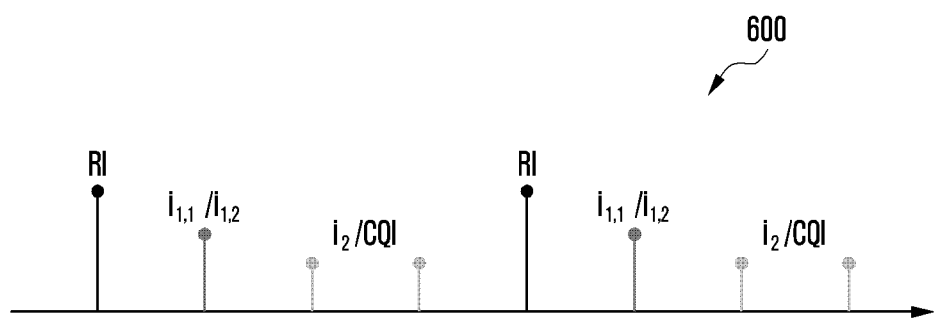
FIG. 6 is a diagram of periodic channel state reporting supported by terminals for which CSI-RSs of 12 or more ports are configured in long-term evolution (LTE) release 13 (Rel-13) and LTE release 14 (Rel-14), according to an embodiment.

FIG. 6 is a diagram of a periodic channel state reporting time point for a CSI-RS port of 12 ports or more for a 2-D array antenna supported by LTE Rel-13 and Rel-14, according to an embodiment.

LTE Rel-13 and Rel-14 support a non-precoded (NP) CSI-RS to support 12 or more CSI-RS ports for 2-D array antennas. The NP CSI-RS supports 8, 12, 16 or more CSI-RS ports by using positions for the existing CSI-RS in one subframe. The corresponding field is configured to CSI-RS-ConfigNZP-EMIMO. A terminal may identify a position for a CSI-RS resource and may receive a CSI-RS, by using the same. Further, in a beamformed (BF) CSI-RS, individual CSI-RS resources are combined and used as the BF CSI-RS, by using csi-RS-ConfigNZPIdListExt-r13 and csi-M-ConfigIdListExt-r13, in which the number of CSI-RS ports, a subframe, and a codebook subset restriction may all be different in each of the individual CSI-RS resources.

In order to support a 2D antenna in the NP CSI-RS, a new 2D codebook is required, which may vary depending on an oversampling factor, a codebook configuration, and a dimension-specific antenna. According to analysis of PMI bits of the 2D codebook, in the case of bits for $i_2$ ($W_2$) reporting, it is possible to use an existing channel state reporting method, in which all of the bits are 4 bits or less. However, in the case of $i_{1,1}$ and $i_{1,2}$, as shown in Table 9 and Table 10, PMI bits are increased with respect to supporting $N_1$, $N_2$, $O_1$, $O_2$, and codebookConfig, as follows.

TABLE 9

| ($N_1$, $N_2$) | ($O_1$, $O_2$) combinations |
|---|---|
| (8, 1) | (4, —) (8, —) |
| (2, 2) | (4, 4) (8, 8) |
| (2, 3) | {(8, 4) (8, 8)} |
| (3, 2) | {(8, 4) (4, 4)} |
| (2, 4) | {(8, 4) (8, 8)} |
| (4, 2) | {(8, 4) (4, 4)} |

TABLE 10

| | | Config = 1 | | | Config = 2, 3, 4 | | | |
|---|---|---|---|---|---|---|---|---|
| ($N_1$, $N_2$) | ($O_1$, $O_2$) | $W_{1,1}/W_{1,2}$ bits | ($O_1$, $O_2$) | $W_{1,1}/W_{1,2}$ bits | ($N_1$, $N_2$) | ($O_1$, $O_2$) | $W_{1,1}/W_{1,2}$ bits | ($O_1$, $O_2$) | $W_{1,1}/W_{1,2}$ bits |
| (8, 1) | (4, —) | 5 + 2 (additional for rank 3, 4) | (8, —) | 6 + 2 | (8, 1) | (4, —) | 4 + 2 | (8, —) | 5 + 2 |
| (2, 2) | (4, 4) | 3 + ⅓ | (8, 8) | 4 + ¼ | (2, 2) | (4, 4) | 2 + ½ | (8, 8) | 3 + ⅓ |
| (2, 3) | (8, 4) | 4 + ¼ | (8, 8) | 4 + ⅓ | (2, 3) | (8, 4) | 3 + ⅓ | (8, 8) | 3 + ¼ |
| (3, 2) | (8, 4) | 5 + ⅓ | (4, 4) | 4 +$^{+12}$⅓ | (3, 2) | (8, 4) | 4 + ½ | (4, 4) | 3 + ½ |
| (2, 4) | (8, 4) | 4 + ¼ | (8, 8) | 4 + ⅕ | (2, 4) | (8, 4) | 3 + ⅓ | (8, 8) | 3 + ¼ |
| (4, 2) | (8, 4) | 5 + ⅓ | (4, 4) | 4 + ⅓ | (4, 2) | (8, 4) | 4 + ½ | (4, 4) | 3 + ½ |

Based on the above table, when ($N_1$, $N_2$, $O_1$, $O_2$)=(2, 4, 8, 8) and Config is one, $i_1$ is required in order to transmit a maximum of 10 bits. When PUCCH format 2, used for existing periodic channel state reporting, up to 13 bits of Reed-Muller codes used for channel coding can be transmitted. However, when an extended cyclic prefix (CP), since HARQ ACK/NACK of two bits should be supported, an actual payload size transmittable in a normal CP situation is 11 bits. In order to support the payload size, in both a wideband CQI mode and a subband CQI mode, a channel state is reported using the three independent CSI reporting time points, as shown in FIG. 6.

LTE may support aperiodic feedback, in addition to periodic feedback of the terminal. When a base station desires to obtain aperiodic feedback information of a predetermined terminal, the base station may configure an aperiodic feedback indicator included in downlink control information (DCI) for uplink data scheduling of the corresponding terminal to execute predetermined aperiodic feedback, and executes uplink data scheduling of the corresponding terminal. When the terminal receives, at an $n^{th}$ subframe, an indicator that is configured to execute aperiodic feedback, the terminal executes uplink transmission by including aperiodic feedback information in data transmission at an n+$k^{th}$ subframe. Here, k is a parameter defined in the LTE Release 11 standard, which is 4 in the case of frequency-division duplexing (FDD), and may be defined as shown in Table 11 in the case of time-division duplexing (TDD).

TABLE 11

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When aperiodic feedback is configured, the feedback information may include an RI, PMI, and CQI in the same manner as the periodic feedback, and the RI and the PMI may not be fed back on the basis of a feedback configuration. The CQI may include both a wCQI and an sCQI, or may include only wCQI information.

LTE may provide a codebook subsampling function for periodic channel state reporting. In LTE, periodic feedback of the terminal may be transmitted to a base station through a physical uplink control channel (PUCCH). The amount of information that may be transmitted through a PUCCH at one time is limited, and thus, various feedback objects, such as, an RI, a wCQI, an sCQI, a PMI1, a wPMI2, an sPMI2, and the like, may be transmitted through a PUCCH after subsampling, or two or more pieces of feedback information may be jointly encoded and transmitted through a PUCCH. When the number of CSI-RS ports configured by a base station is 8, an RI and a PMI1 reported in submode 1 of PUCCH mode 1-1 may be jointly encoded as shown in Table 12 below.

Referring to Table 12, an RI formed of 3 bits and a PMI1 formed of 4 bits are jointly encoded to have a total of 5 bits. In submode 2 of PUCCH mode 1-1, as shown in Table 13 below, a PMI1 formed of 4 bits and a PMI2 formed of another 4 bits are jointly encoded to form a total of 4 bits of information. Since a subsampling scale is larger than submode 1 (subsampling 7 bits to 5 bits in submode 1, and subsampling 8 bits to 4 bits in submode 2), more precoding factors may not be reported. When the number of CSI-RS ports configured by a base station is 8, a PMI2 reported in PUCCH mode 2-1 may be subsampled as shown in Table 11. For example, referring to Table 11, PMI2 is reported to have 4 bits when the associated RI is 1. However, when the associated RI is a value greater than or equal to 2, a differential CQI for a second code word needs to be additionally reported, and thus the PMI2 is subsampled to 2 bits of information and reported.

TABLE 12

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1} - 8)$ |
| 16-17 | 3 | $2(I_{RI/PMI1} - 16)$ |
| 18-19 | 4 | $2(I_{RI/PMI1} - 18)$ |
| 20-21 | 5 | $2(I_{RI/PMI1} - 20)$ |
| 22-23 | 6 | $2(I_{RI/PMI1} - 22)$ |
| 24-25 | 7 | $2(I_{RI/PMI1} - 24)$ |
| 26 | 8 | 0 |
| 27-31 | reserved | NA |

TABLE 13

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | Codebook index $i_1$ | Value of the second PMI $I_{PMI2}$ | Codebook index $i_2$ | total #bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4\lfloor I_{PMI2}/4 \rfloor + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

TABLE 14

Relationship between the second PMI value and codebook index $i_2$

| RI | Value of the second PMI $I_{PMI2}$ | Codebook index $i_2$ |
|---|---|---|
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Figure 7:
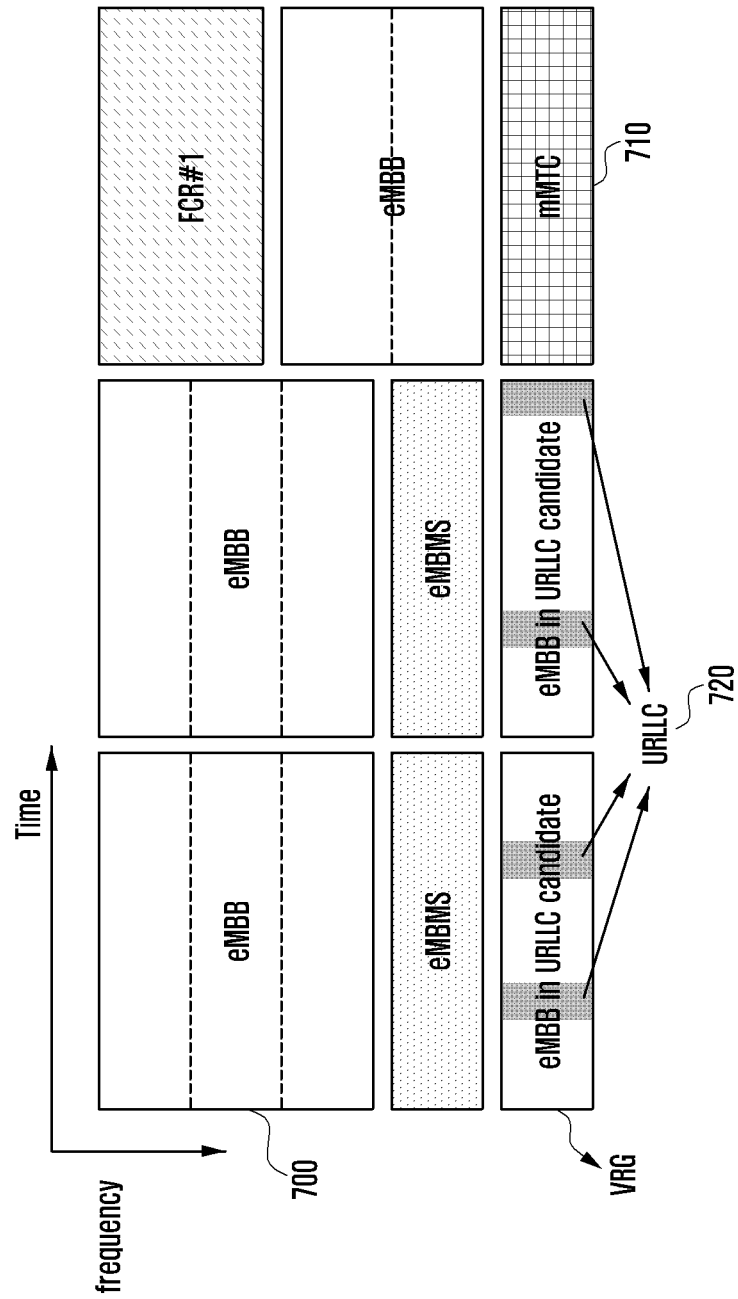
FIG. 7 is a diagram of a radio resource setting of data, such as enhanced mobile broadband (eMBB), ultra-reliable and low-latency communications (URLLC), and massive MTC (mMTC), in an NR system), according to an embodiment.

FIG. 7 is a diagram in which data, such as eMBB, URLLC, and mMTC, which correspond to services considered in the NR system, is allocated in a frequency-time resource together with a forward-compatible resource (FCR), according to an embodiment.

When eMBB 700 and mMTC 710 are allocated to a specific frequency band and transmitted, if URLLC data 720 is generated and required to be transmitted, the eMBB and mMTC empty pre-allocated parts, and the URLLC data is transmitted. Among the services, since a short delay time is particularly important for URLLC, the URLLC data may be allocated to a portion of the resources to which the eMBB has been allocated, and may be transmitted, and information about the eMBB resources may be provided to the terminal in advance. To this end, the eMBB data may not be transmitted in a frequency-time resource in which the eMBB data and the URLLC data overlap, and therefore the transmission performance of the eMBB data may be lowered. That is, eMBB data transmission failure due to URLLC allocation may occur. The length of a transmission time interval (TTI) used for URLLC transmission may be shorter than the TTI length used for eMBB or mMTC transmission.

In a procedure of accessing a wireless communication system by the terminal, a synchronization signal is used to acquire synchronization with a cell in a network. More specifically, the synchronization signal refers to a reference signal transmitted for time-and-frequency synchronization and cell searching by a base station upon initial access of the terminal, and a signal, such as a primary synchronization signal (PSS) or a secondary synchronization signal (SSS), may be transmitted for synchronization in LTE.

Figure 8:
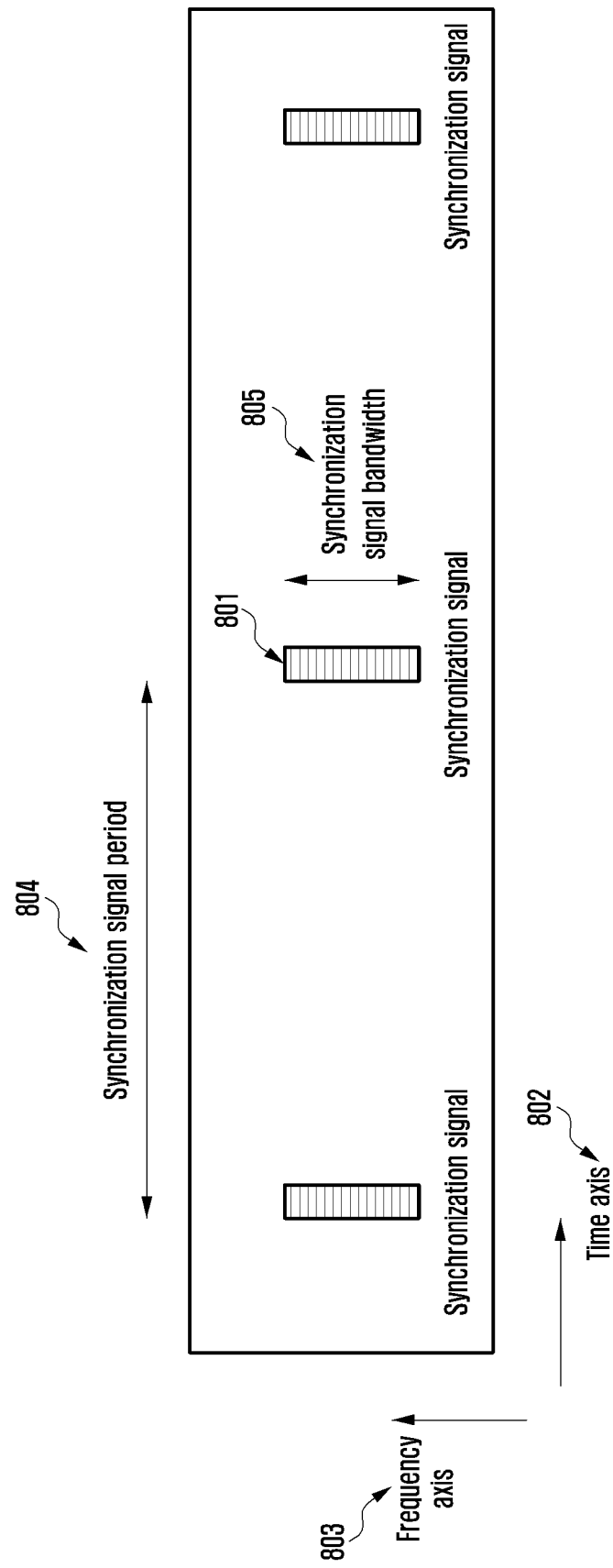
FIG. 8 is a diagram of a synchronization signal that is transmitted in a 5G communication system, according to an embodiment.

FIG. 8 is a diagram in which a synchronization signal is transmitted in the 5G communication system considered in the present disclosure, according to an embodiment.

In FIG. 8, a synchronization signal 801 may be transmitted at each period at a predetermined interval 804 on the time axis 802. The synchronization signal 801 may also be transmitted within a constant synchronization signal transmission bandwidth 805 on the frequency axis 803. In order to indicate a cell number (Cell ID) by using the synchronization signal, a special sequence may be mapped to a subcarrier within the transmission bandwidth 805. The cell number may be mapped using a combination of one or multiple sequences, and therefore the terminal may detect the number of the cell that the terminal desires to access by detecting the sequence used for the synchronization signal. The sequence used for the synchronization signal may be a sequence having a constant amplitude zero auto correlation (CAZAC) characteristic, such as a Zadoff-Chu sequence or a Golay sequence, or may be a pseudo-random noise sequence, such as an m-sequence or a gold sequence. It is assumed that the above-mentioned synchronization signal is used for a synchronization signal, but the disclosure is not limited to any specific signal.

The synchronization signal 801 may be configured using one OFDM symbol or a plurality of OFDM symbols. When the synchronization signal 801 is configured using a plurality of OFDM symbols, a sequence for a plurality of different synchronization signals may be mapped to each OFDM symbol. For example, as in LTE, three Zadoff-Chu sequences may be used to generate a PSS, and a gold Sequence may be used to generate an SSS. A PSS of one cell may have three different values according to the physical layer cell ID of the cell, and the three cell IDs in one cell ID group correspond to different PSSs. Therefore, the terminal may detect the PSS of the cell to identify one cell ID group among three cell ID groups supported by LTE. The terminal additionally detects an SSS among 168 cell IDs, reduced from 504 cell IDs, via the ID group identified through the PSS, so as to determine the cell ID to which the corresponding cell belongs.

The terminal acquires a cell number in synchronization with a cell within the network, and finds a cell frame timing. Once the cell frame timing is successfully found, the terminal should receive important cell system information. The important cell system information is information that is repeatedly broadcasted by the network, and corresponds to information that the terminal should generally know in order to access the cell and properly operate within the cell. In LTE, system information is transmitted over two different transport channels, in which a limited amount of system information, called a master information block (MIB) is transmitted using a physical broadcast channel (PBCH), and a main part of the system information, corresponding to a system information block (SIB), is transmitted using a PDSCH. More specifically, in the LTE system, the system information included in the MIB includes a downlink transmission bandwidth, PHICH configuration information, and a system frame number (SFN).

Figure 9:
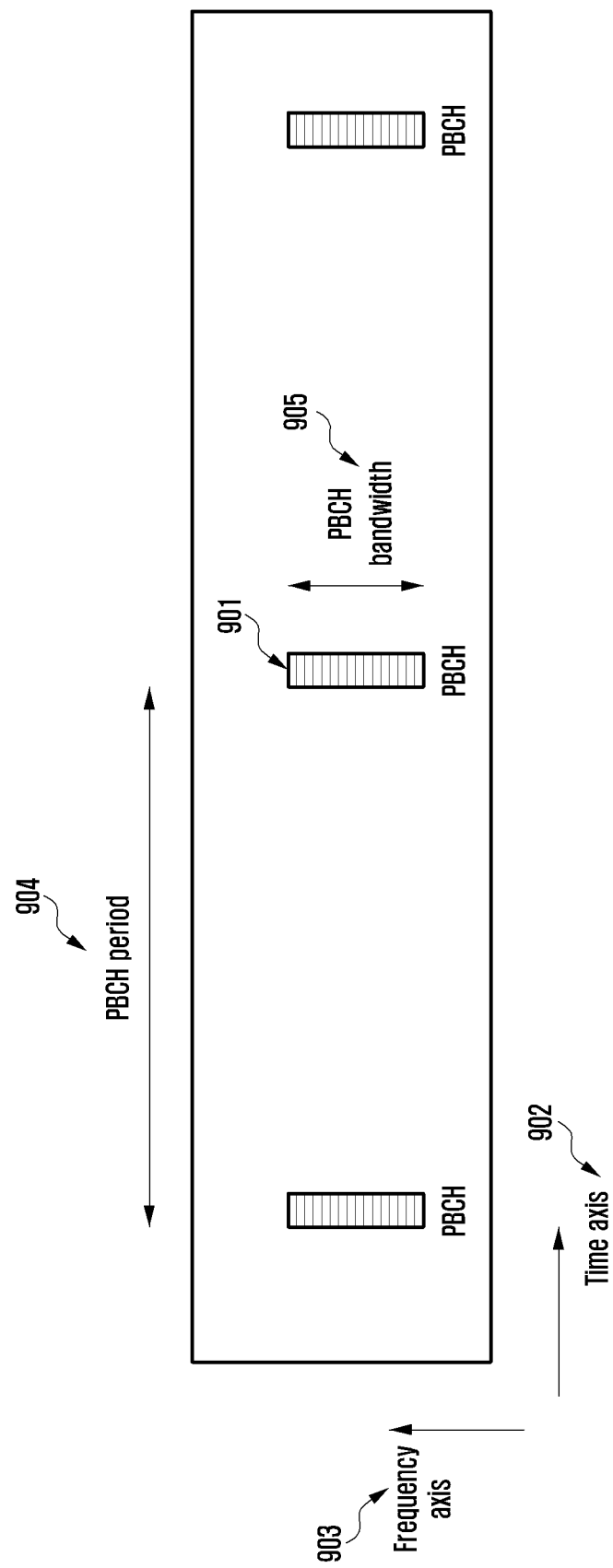
FIG. 9 is a diagram of a physical broadcast channel (PBCH) that is transmitted in the 5G communication system, according to an embodiment.

FIG. 9 is a diagram in which a PBCH is transmitted in the 5G communication system, according to an embodiment. In FIG. 9, a PBCH 901 may be transmitted periodically at a predetermined interval 904 on the time axis 902. The PBCH 901 may also be transmitted within a predetermined PBCH transmission bandwidth 905 on the frequency axis 903. In order to improve coverage, the PBCH may transmit the same signal at the predetermined interval 904, and the terminal may combine the transmitted signals and receive the same. Further, a plurality of antenna ports are used for application of a transmission technique, such as transmit diversity (TxD) and one DMRS port-based precoder cycling, and a diversity gain may thus be obtained without additional information on the transmission technique used by the reception end. It is assumed that the above-mentioned PBCH is used for a PBCH, but the disclosure is not limited to any specific structure.

Similar to the current LTE system, the PBCH 901 may be configured using a plurality of OFDM symbols at resources in a time-frequency domain, or may be scattered over resources in a time-frequency domain. The terminal should receive and decode the PBCH in order to receive system information, and the terminal performs channel estimation on the PBCH by using a CRS in the LTE system.

Figure 10:
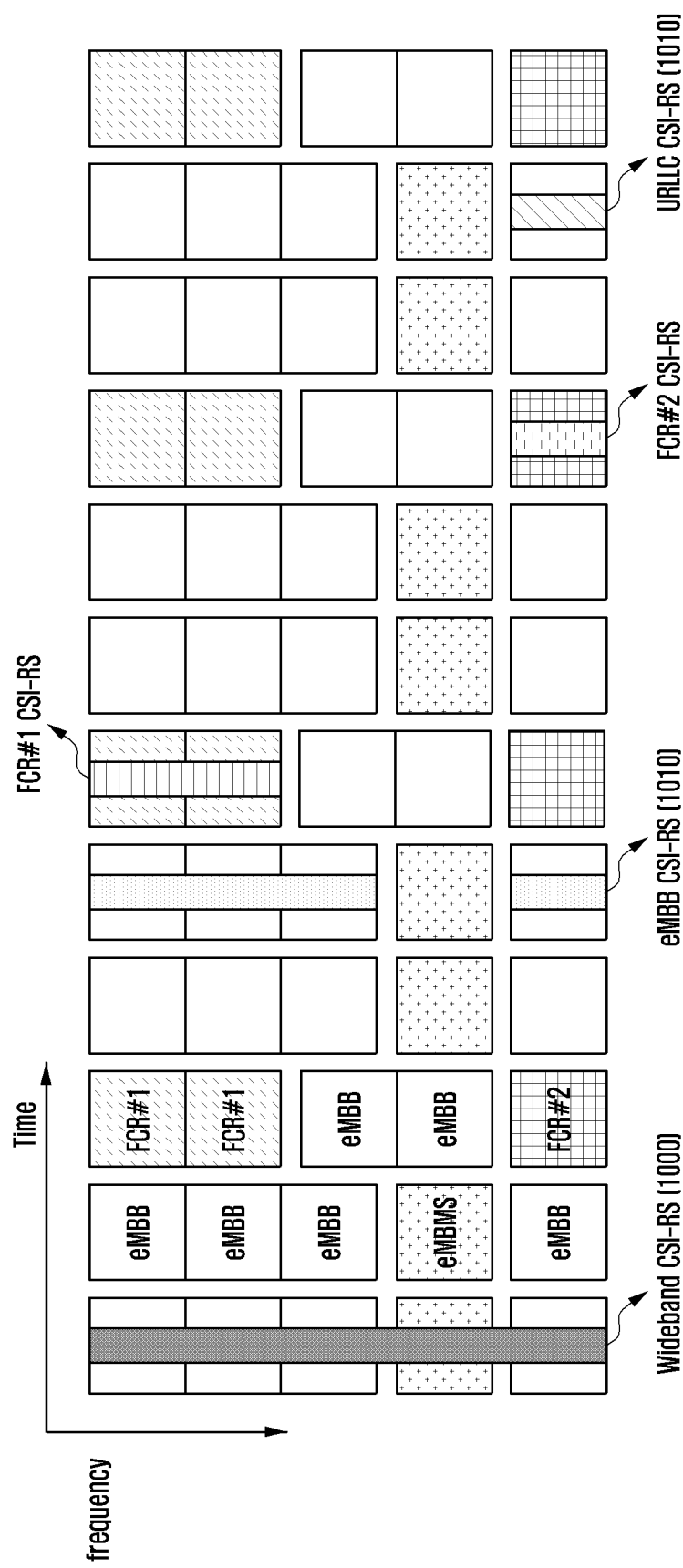
FIG. 10 is a diagram of services that are multiplexed in respective time and frequency resources in the NR system, according to an embodiment.

FIG. 10 is a diagram of services that are multiplexed in respective time and frequency resources in the NR system, according to an embodiment. A base station may allocate CSI-RSs to all (or a plurality of) bands in order to secure initial channel state information for a terminal. The full-band or multiple-band CSI-RS 1000 requires a large amount of reference signal overhead, and it may thus be disadvantageous for optimizing system performance. However, when there is no previously secured information, full-band or multiple-band CSI-RS may be necessary.

After transmission of the full-band or multiple-band CSI-RS, each service may be provided with different requirements for each service, and the accuracy of necessary channel state information and update thereof may also be changed. Therefore, after securing the initial channel state information, the base station may trigger a subband CSI-RS 1010 for each service in a corresponding band according to the necessity for each service. Although FIG. 10 illustrates the transmission of a CSI-RS for each service at one time point, it is also possible that CSI-RSs for a plurality of services are transmitted as needed.

In comparison with the above-mentioned CSI-RS transmission and CSI reporting setting of LTE, a CSI-RS transmission and a CSI reporting setting which are supported by NR may have different forms. NR is different from LTE in that it supports a more flexible CSI repotting setting than LTE through a resource setting, a CSI measurement setting, and a CSI reporting setting, which are necessary in order to support channel state reporting.

Figure 11:
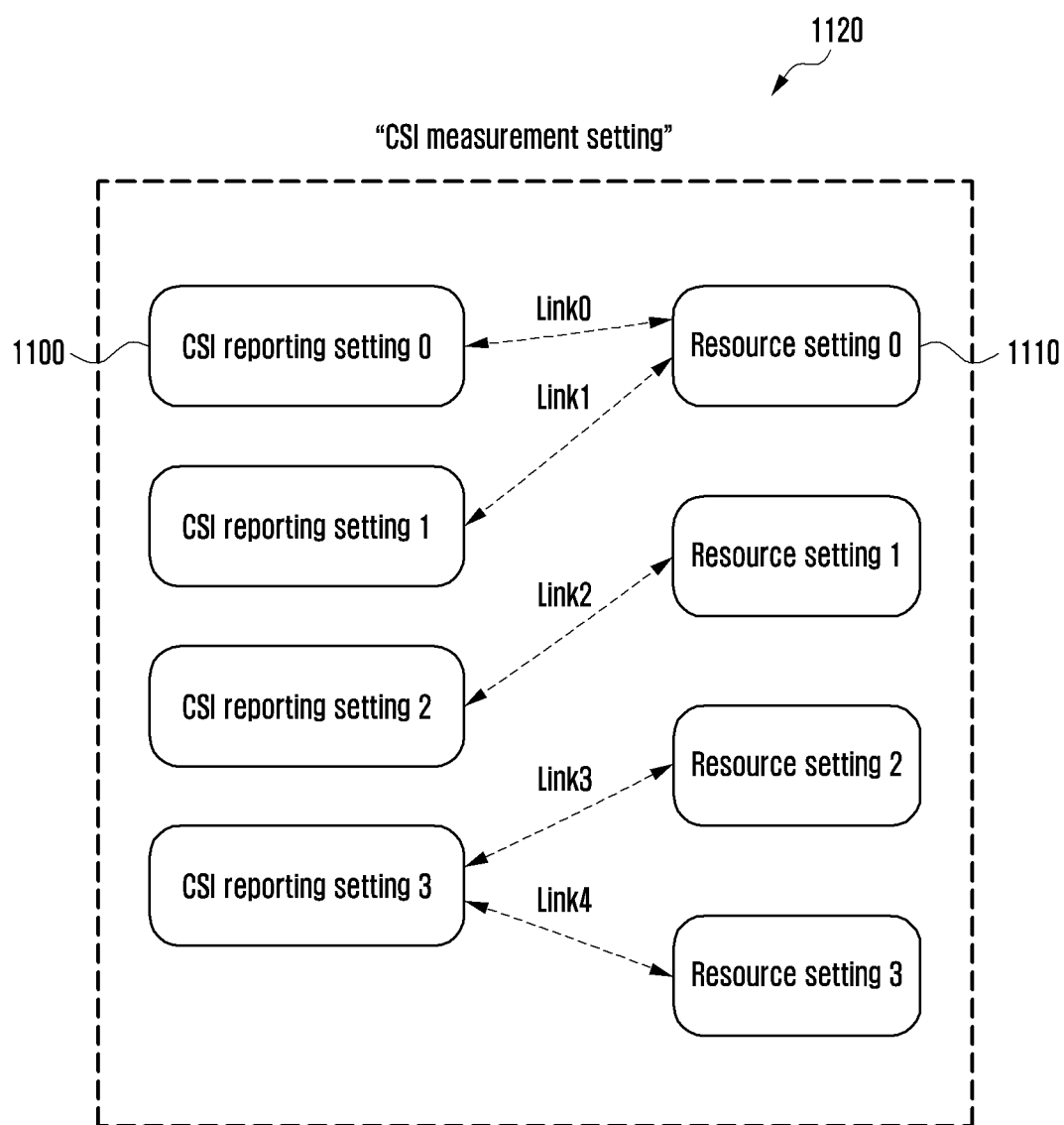
FIG. 11 is a diagram of a base station and a terminal that allow for a flexible configuration through a resource setting, a CSI reporting setting, and a channel state measurement setting in the NR, and in which channel state reporting is performed based on the flexible configuration, according to an embodiment.

FIG. 11 is a diagram of a resource setting, a CSI measurement setting, and a CSI reporting setting which are necessary for supporting channel state reporting in NR, according to an embodiment.

The resource setting, the CSI measurement setting, and the CSI reporting setting may include configuration information as described below.

CSI reporting setting 1100: Turning on/off of report parameters (e.g., RI, PMI, CQI, etc.) required for channel state reporting may be configured. In addition, a channel state report type may be configured (e.g., configuration may be performed according to Type I (channel state reporting having a low resolution and an implicit report type) or Type II (channel state reporting having a high resolution, and a type of explicitly reporting an eigenvector, a covariance matrix, etc., by using linear combination-type channel state reporting). Specifically, a CSI reporting setting (whether to report RI, PMI, CQI, BI, CRI, or the like (an individual configuration or combined configuration)), the reporting method (periodic, aperiodic, and semi-persistent reporting are available, in which the aperiodic and semi-persistent reporting may be configured as one parameter), codebook configuration information, a PMI type (full-band or partial-band), a channel state report type (implicit/explicit or Type I/Type II), a channel quality report type (CQI/RSRP), and a resource setting for channel state reporting may be supported.

Resource setting 1110: Resource setting corresponds to a configuration including configuration information relating to a reference signal required for channel state measurement. A CSI-RS resource for channel measurement and an interference measurement resource (CSI-IM) for interference measurement may be configured via resource setting, and a plurality of resource settings may exist for this purpose. In addition, a transmission type of a corresponding reference signal (periodic, aperiodic, and semi-persistent transmission), a transmission period and offset of the reference signal, and the like can be configured.

CSI measurement setting 1120: CSI measurement setting corresponds to configuration of mapping or connection between the CSI reporting setting and the resource setting. When there are N CSI reporting settings and M resource settings, L links establishing the mapping between these multiple CSI repotting settings and resource settings may be included in the CSI measurement setting. An association configuration between the reference signal configuration and a reporting time point (e.g., when the reference signal is to be transmitted to n subframes or slots, the reporting time point may be configured using parameters, such as D0-0, D1-0, D2-1, D3-2 and D3-3, and the reporting time point may be defined as n+D0-0 accordingly) may also be configured via CSI measurement setting.

In addition to periodic and aperiodic channel state reporting supported by LTE, the NR supports semi-persistent reference signal transmission and channel state information. The periodic and semi-persistent channel state information of the NR may not support subband reporting among the above-mentioned reporting modes. The PUCCH used in the periodic and semi-persistent channel state reporting has a limited amount of reports that may be transmitted. Therefore, as mentioned above, in LTE, the terminal may be allowed to select some subbands in the bandwidth and report channel state information relating to the subbands. However, since a report on such selective subbands contains very limited information, the usefulness of this information may be minimal Therefore, the lack of support for such reporting may result in reduced complexity of the terminal and increased efficiency of the reporting. In addition, since subband reporting is not supported, a PMI may not be reported, or only one PMI corresponding to a wideband or partial band may be transmitted in periodic channel state information reporting in the NR.

The aperiodic channel state information reporting of the NR may support the following reporting modes.

Reporting mode 1-2 (wideband CQI with multiple PMI): RI, broadband (wideband), CQI (wCQI), a plurality of broadband and narrowband PMIs Reporting mode 2-0 (subband CQI with no PMI): RI, wCQI, and a narrowband (subband) CQI (sCQI) of a band selected by the terminal Reporting mode 2-2 (subband CQI with multiple PMIs): RI, wCQI, sCQI, a plurality of broadband and narrowband PMIs Reporting mode 3-0 (subband CQI with no PMI): RI, wCQI, and a narrowband (subband) CQI (sCQI) of the full band Reporting mode 3-2 (subband CQI with multiple PMIs): RI, wCQI, a narrowband (subband) CQI (sCQI) of the full band, and a plurality of broadband and narrowband PMIs Similar to cyclic channel state reporting, report modes 2-0 and 2-2 correspond to a type of selecting and reporting of subbands of the portion of the bandwidth of the terminal, and may not be supported in NR due to the low efficiency of the reporting. In the periodic channel state reporting in LTE, a reporting mode can be determined using the CQI setting and the PMI/RI report setting of a channel state reporting mode setting of the corresponding channel, and a channel state reporting mode can be directly configured when using aperiodic channel state reporting. In the NR, the PMI/RI report setting and the CQI reporting setting may be provided in the above-mentioned CSI reporting settings, respectively.

As mentioned above, the NR supports two types of channel state reporting having a low spatial resolution and a high spatial resolution. Tables 15 and 16 and Tables 17 and 18 below show two types of channel state reporting and the reporting overhead required for each report type. Particularly, Table 15 indicates Type 1 channel state reporting, Table 16 indicates Type 2 channel state reporting, Table 17 indicates the overhead necessary for Type 1 channel state reporting, and Table 18 indicates the overhead necessary for Type 2 channel state reporting.

TABLE 15

In the case of two antenna ports, the NR supports a Type 1 codebook described below.

$$W \in \left\{ \frac{1}{\sqrt{2}} \begin{bmatrix} 1 \\ e^{j\frac{\pi n}{2}} \end{bmatrix}, n = 0, 1, 2, 3 \right\} \text{ for rank-1 and}$$

$$\left\{ \frac{1}{2} \begin{bmatrix} 1 & 1 \\ j^n & -j^n \end{bmatrix}, n = 0, 1 \right\} \text{ for rank-2}$$

In the case of four or more antenna ports, the NR supports channel state reporting for rank 1 to 8 according to the description below.

(1) A PMI codebook assumes a precoder structure of $W = W_1 W_2$, wherein $W_1$ is configured by $$W_1 = \begin{bmatrix} B & 0 \\ 0 & B \end{bmatrix},$$

and B includes L oversampled 2D DFT beams. In the case of ranks 1 and 2, the value of L can be set as 1 or 4, and $W_2$ selects a beam (this is applicable only when L = 4) and indicates QPSK co-phasing with respect to two TABLE 15-continued polarizations.

(2) The following 1D/2D antenna port layouts ($N_1$ and $N_2$) and oversampling factors ($O_1$, $O_2$) are supported.

| Number of CSI-RS ports | ($N_1$, $N_2$) | ($O_1$, $O_2$) |
|---|---|---|
| 4 | (2, 1) | (4, —) |
| 8 | (2, 2) | (4, 4) |
|   | (4, 1) | (4, ) |
| 12 | (3, 2) | (4, 4) |
|    | (6, 1) | (4, ) |
| 16 | (4, 2) | (4, 4) |
|    | (8, 1) | (4, ) |
| 24 | (6, 2), (4, 3) | (4, 4) |
|    | (12, 1) | (4, 4) |
| 32 | (8, 2), (4, 4) | (4, 4) |
|    | (16, 1) | (4, ) |

(3) When L = 4, the beam group (B) pattern, as illustrated in FIG. 23, is supported according to the value of N2.

TABLE 16

The NR supports Type 2 channel state reporting with respect to ranks 1 and 2.
(1) PMI is used for spatial channel information feedback.
(2) In the case of ranks 1 and 2, the PMI codebook assumes the following precode structure.

For rank 1: $W = \begin{bmatrix} \tilde{W}_{0,0} \\ \tilde{W}_{1,0} \end{bmatrix} = W_1 W_2$, W is normalized to 1

For rank 2: $W = \begin{bmatrix} \tilde{W}_{0,0} & \tilde{W}_{0,1} \\ \tilde{W}_{1,0} & \tilde{W}_{1,1} \end{bmatrix} = W_1 W_2$, columns of $W$ are normalized to $\frac{1}{\sqrt{2}}$ TABLE 16-continued (3) $\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}$ (a weighted combination of L beams)
The value of L may be chosen from among 2, 3, and 4, $b_{k_1 \cdot k_2}$ is an oversampled 2D DFT beam, r is 0 or 1 and refers to polarization, and l is 0 or 1 and refers to a layer.
$p_{r,l,i}^{(WB)}$ is a wideband (WB) beam amplitude scaling factor for beam i, polarization r, and layer l.
$p_{r,l,i}^{(SB)}$ is a subband (SB) beam amplitude scaling factor for beam i, polarization r, and layer l.
$c_{r,l,i}$ is a beam combination coefficient (phase) for beam i, polarization r, and layer l, which is configurable between 2 bits in the case of QPSK and 3 bits in the case of 8PSK.
An amplitude scaling mode is configurable by a combination of WB and SB(with unequal bit allocation), or by WB only.

TABLE 17

| Number of CSI-RS ports | ($N_1$, $N_2$) | ($O_1$, $O_2$) | i1 Payload (L = 1) | i1 Payload (L = 4) | i2 payload |
|---|---|---|---|---|---|
| 4 | (2, 1) | (4, —) | 3 bits | 2 bits | For rank1, |
| 8 | (2, 2) | (4, 4) | 6 bits | 4 bits | 2 bits for |
|   | (4, 1) | (4, —) | 4 bits | 3 bits | L = 1, |
| 12 | (3, 2) | (4, 4) | 7 bits | 5 bits | 4 bits for |
|    | (6, 1) | (4, —) | 4 bits | 3 bits | L = 4 |
| 16 | (4, 2) | (4, 4) | 7 bits | 5 bits | For rank2, |
|    | (8, 1) | (4, —) | 5 bits | 4 bits | Additional |
| 24 | (6, 2), (4, 3) | (4, 4) | 8 bits | 6 bits | 2 bits |
|    | (12, 1) | (4, —) | 6 bits | 5 bits | for i1, |
| 32 | (8, 2), (4, 4) | (4, 4) | 8 bits | 6 bits | 1 bits for |
|    | (16, 1) | (4, —) | 6 bits | 5 bits | L = 1, |
|    |    |    |    |    | 3 bits lor |
|    |    |    |    |    | L = 4 |

Table 18 describes a reporting overhead for Type 2 channel state reporting, and particularly describes an example in which, a combination of amplitudes of a wideband (WB) and a subband (SB), ($N_1$, $N_2$)=(4,4), Z=3 (8PSK), and K leading coefficients=4, 4, and 6 for L=2, 3, and 4, respectively.

TABLE 18

| L | Rotation: $\lceil \log_2(O_1 O_2) \rceil$ | L-beam selection | Strongest coefficient (1 out of 2 L): $\lceil \log_2 2L \rceil$ per layer | WB amp: 3 × (2 L − 1) per layer | Total WB payload | SB amp (1 SB): 1 × (K − 1) per layer | SB phase (1 SB): Z × (K − 1) + 2 × (2 L − K) per layer | Total payload (WB + 10 SBs) |
|---|---|---|---|---|---|---|---|---|
| Rank 1 payload (bits) | | | | | | | | |
| 2 | 4 | [7 or 8] | 2 | 9 | 22 | 3 | 9 | 142 |
| 3 | 4 | [10 or 12] | 3 | 15 | 32 | 3 | 13 | 192 |
| 4 | 4 | [11 or 16] | 3 | 21 | 29 | 5 | 19 | 279 |
| Rank 2 payloads (bits) | | | | | | | | |
| 2 | 4 | [7 or 8] | 4 | 18 | 33 | 6 | 18 | 273 |
| 3 | 4 | [10 or 12] | 6 | 30 | 50 | 6 | 26 | 370 |
| 4 | 4 | [11 or 16] | 6 | 42 | 63 | 10 | 38 | 543 |

As described above in Table 18, Type I channel state reporting may report a channel state to the base station via RI, PMI, CQI, and CSI-RS resource indicator (CRI) based on a codebook, as in the existing LTE. In contrast, Type II reporting may provide a higher form of resolution via greater PMI reporting overhead in addition to an implicit CSI similar to Type I reporting, and the PMI reporting may be created via a linear combination of a precoder, a beam, a co-phase, etc. which are used for the Type I reporting. Also, in order to directly report a channel state, CSI may be reported in an explicit CSI type that is different from an existing type, and a representative example thereof may be a method of reporting a covariance matrix of a channel; a type in which implicit and explicit CSI are combined is also possible. For example, a PMI may be used to report the covariance matrix of the channel, but in addition, the CQI or RI may be reported together.

As mentioned above, Type II requires a high reporting overhead. Therefore, this report may not be suitable for periodic channel state reporting where the number of reportable bits is not high. On the other hand, when aperiodic channel state reporting is used, since the corresponding channel state reporting is supported via PUSCH, which is capable of supporting overheads having a large number of reports, Type II reporting which requires the overhead having a large number of reports, may be supported only for aperiodic channel state reporting.

In addition, semi-persistent channel state reporting may support Type 2. In the NR, semi-persistent channel state reporting supports dynamic activity and inactivity compared to periodic channel state reporting, and thus requires relatively high terminal complexity.

In channel state reporting of the LTE, as noted above in Table 1, the base station performs, on the basis of a CSI process, a reference signal configuration and a report-related configuration for the terminal via a higher-layer configuration. Accordingly, reporting is made at a previously configured reporting time point and resources in the case of periodic channel state reporting, and configuration information previously configured via a trigger in DCI transferred by the base station via a downlink control signal is reported in the case of aperiodic channel state reporting.

In the NR, as noted in FIG. 11, the CSI reporting setting, the resource setting, and a link for connecting the same exist in the CSI measurement setting. When periodic and semi-persistent channel state reporting is used, according to the DCI and RRC setting of the base station or a media access control (MAC) CE-based activation or deactivation signal, a channel state may be periodically or semi-persistently reported on the basis of the CSI reporting setting. When aperiodic channel state reporting is used, channel state reporting may be triggered using the following methods.

Aperiodic channel state report trigger method 1: Triggering based on a link within a CSI measurement setting; and Aperiodic channel state report trigger method 2: Triggering based on a CSI reporting setting within a CSI measurement setting.

Aperiodic channel state report trigger method 1 is a method of triggering CSI reporting based on a link within a CSI measurement setting.

Figure 12:
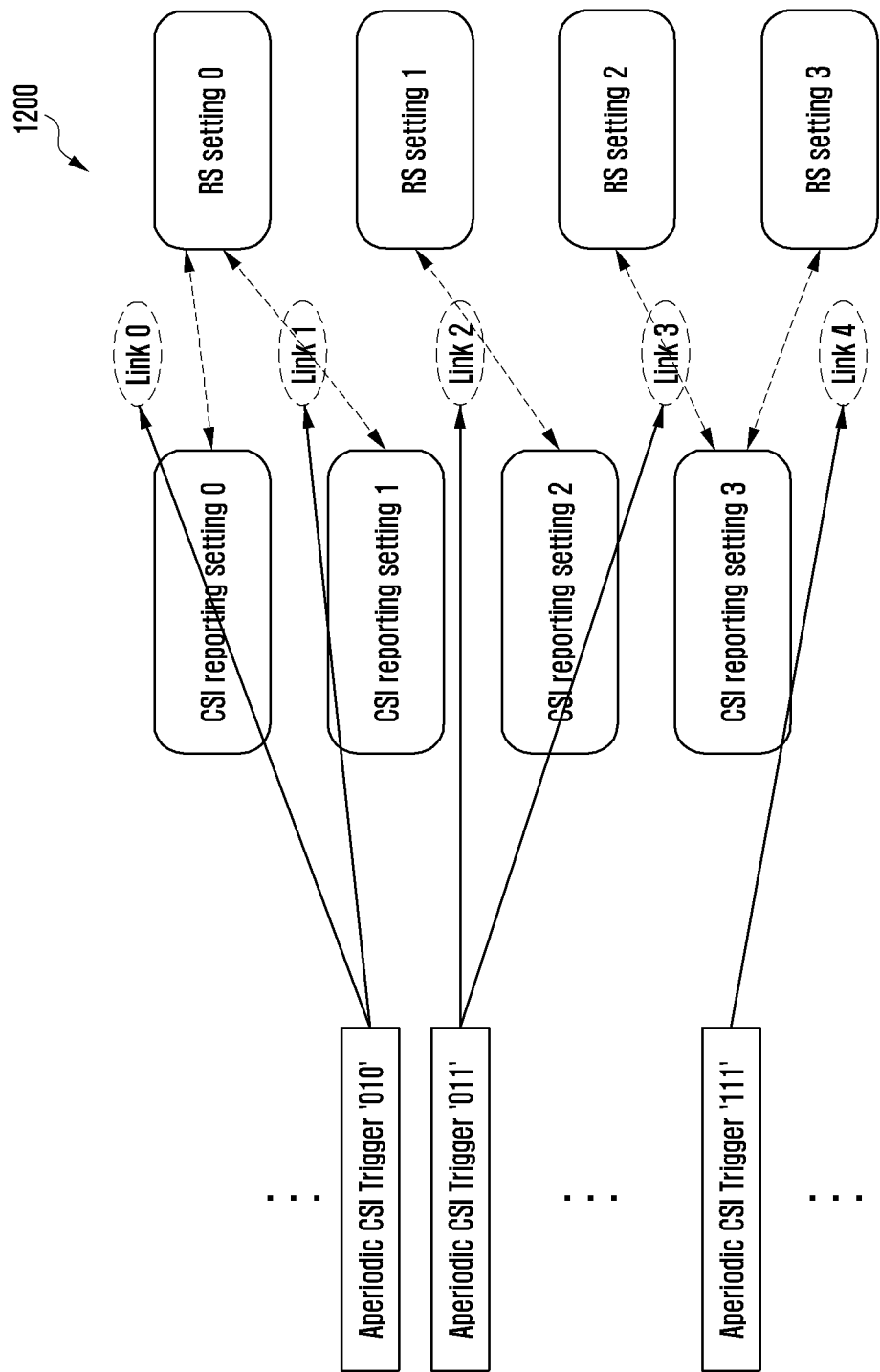
FIG. 12 is a diagram of a method for triggering a link within a trigger measurement setting according to an aperiodic channel state report trigger method 1, according to an embodiment.

FIG. 12 is a diagram of a method for triggering a link within a CSI measurement setting according to aperiodic channel state report trigger method 1, according to an embodiment.

In FIG. 12, a base station may configure a link triggered for each trigger field to RRC in advance for aperiodic channel state reporting 1200. The base station may directly configure a link ID in a trigger configuration in order to configure the link to be triggered. The base station may configure a link triggered using bitmaps indicating links of all cells configured for the terminal. The instruction order of the bitmaps may be sorted in ascending or descending order based on a cell ID and a link ID.

Figure 13:
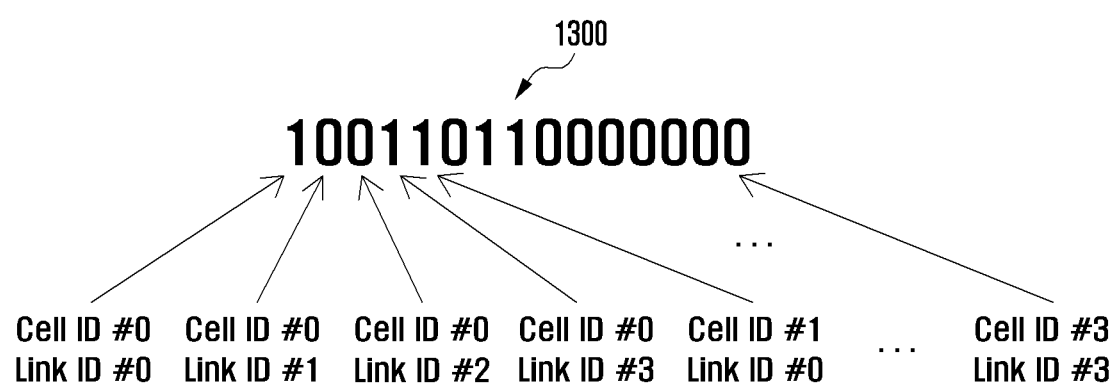
FIG. 13 is a diagram of an indication sequence of bitmaps for the aperiodic channel state report trigger method 1, according to an embodiment.

FIG. 13 is a diagram of an indication order of bitmaps, according to an embodiment.

An indication order of a bitmap 1300 may first be arranged based on cell IDs, and may be arranged in ascending order from MSB to LSB based on the link IDs within the same cell IDs. In FIG. 13, the cell IDs are preferentially arranged; however, the link IDs may be arranged first, or may be sorted in descending order.

Aperiodic channel state report trigger method 2 is a method for triggering CSI reporting based on a CSI reporting setting within a CSI measurement setting.

Figure 14:
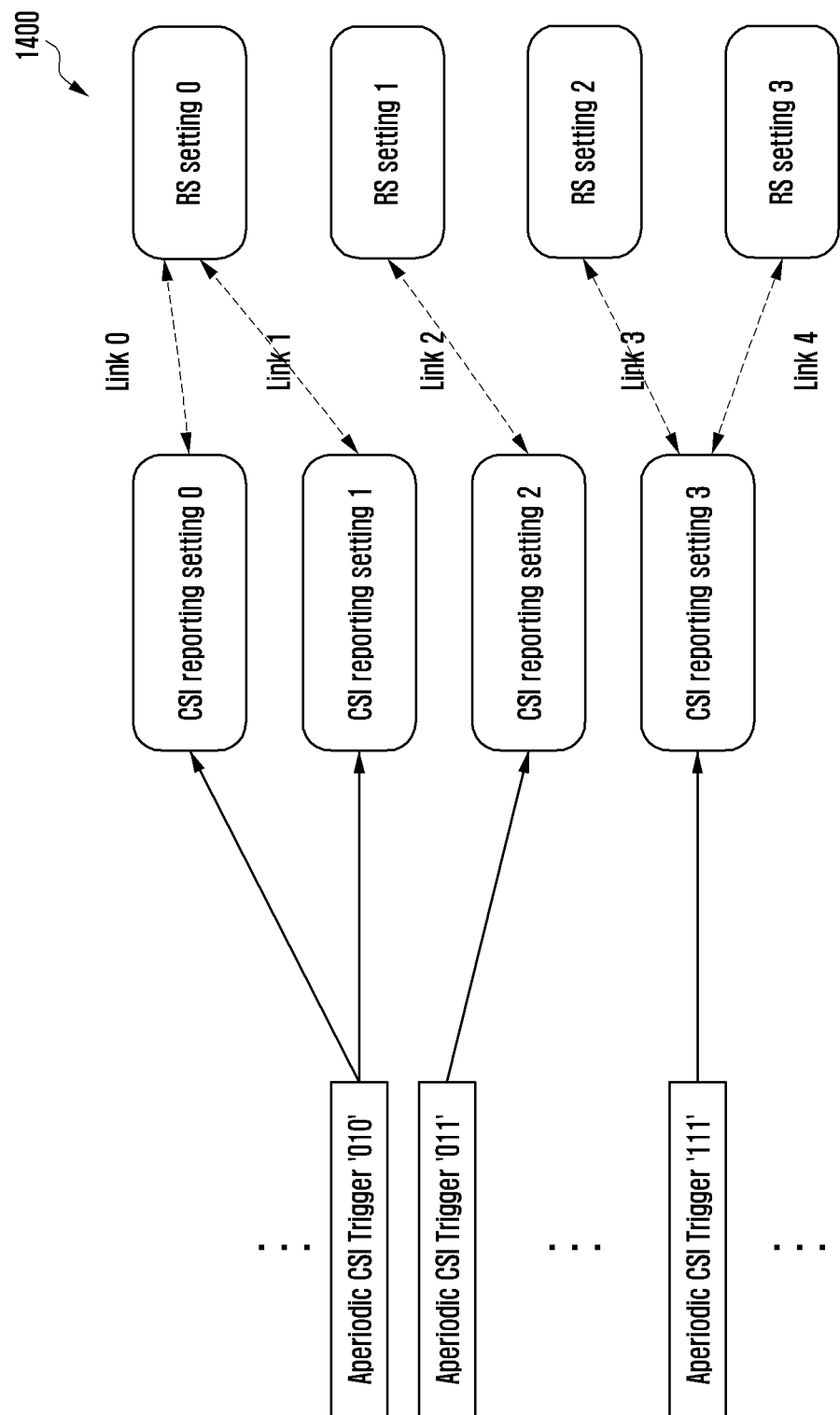
FIG. 14 is a diagram of a method for triggering a CSI reporting setting within a trigger measurement setting according to an aperiodic channel state report trigger method 2, according to an embodiment.

FIG. 14 is a diagram of a method for triggering a CSI reporting setting within a trigger measurement setting according to aperiodic channel state report trigger method 2, according to an embodiment. In FIG. 14, a base station may configure, in advance, a CSI reporting setting triggered for each trigger field via RRC for aperiodic channel state reporting 1400. The base station may directly configure a CSI reporting setting ID in a trigger configuration in order to configure the triggered CSI reporting setting. The base station may configure a triggered CSI reporting setting by using bitmaps indicating CSI reporting settings of all cells configured for the terminal. The instruction order of the bitmaps may be arranged in ascending or descending order based on a cell ID, a CSI reporting setting ID, etc.

Figure 15:
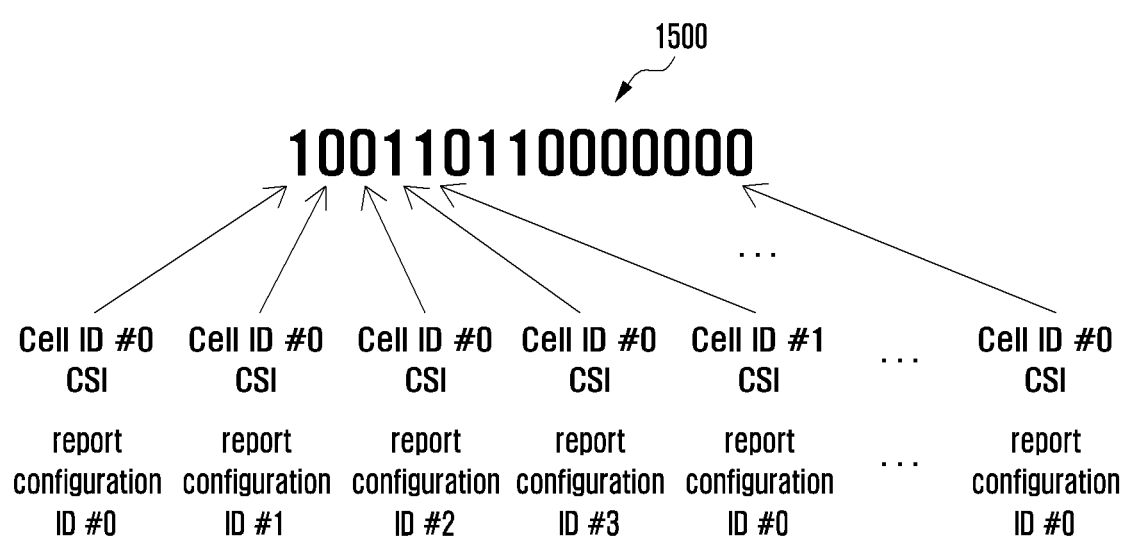
FIG. 15 is a diagram of an indication sequence of bitmaps for the aperiodic channel state report trigger method 2, according to an embodiment.

FIG. 15 is a diagram of an indication order of bitmaps, according to an embodiment.

As shown in FIG. 15, an indication order of a bitmap 1500 may first be arranged based on the cell IDs, and may be arranged in ascending order from MSB to LSI based on channel state report IDs within the same cell IDs. In FIG. 15, the cell IDs are preferentially arranged; however, the channel state report IDs may be arranged first, or may be sorted in descending order.

In order for a base station to trigger CSI reporting based on the links, the base station may cause a terminal to perform aperiodic channel state reporting to the base station, via DCI by using the trigger fields shown in Tables 19, 20, and 21.

TABLE 19

| Value of CSI request field | Description |
|---|---|
| '000' | No aperiodic CSI report is triggered |
| '001' | Aperiodic CSI report is triggered for a set of link(s) configured by higher layers for serving cell |
| '010' | Aperiodic CSI report is triggered for a $1^{st}$ set of link(s) configured by higher layers |
| ... | ... |

TABLE 20

| Value of CSI request field | Description |
|---|---|
| '000' | Aperiodic CSI report is triggered for a set of link(s) configured by higher layers for serving cell |

TABLE 20-continued

| Value of CSI request field | Description |
|---|---|
| '001' | Aperiodic CSI report is triggered for a $1^{st}$ set of link(s) configured by higher layers |
| '010' | Aperiodic CSI report is triggered for a $2^{nd}$ set of link(s) configured by higher layers |
| . . . | . . . |

TABLE 21

| Value of CSI request field | Description |
|---|---|
| '000' | Aperiodic CSI report is triggered for a $1^{st}$ set of link(s) configured by higher layers |
| '001' | Aperiodic CSI report is triggered for a $2^{nd}$ set of link(s) configured by higher layers |
| '010' | Aperiodic CSI report is triggered for a $3^{rd}$ set of link(s) configured by higher layers |
| . . . | . . . |

In Table 19, the base station may perform triggering for the terminal by using the indication fields, so that aperiodic channel state reporting is not triggered or so that all links of a corresponding cell may be triggered, and from the bit "010" subsequent to "001", links triggered for channel state reporting via a pre-RRC setting may be triggered as described above with respect to the trigger method 1. The trigger fields used in Table 20 exclude a case involving no triggering therefrom. In this case, there may be an option involving no triggering of channel state reporting, in pre-configuration of a trigger field for which "001" or the like can be configured. According to Table 21, flexibility may be provided in configuration of the base station, by increasing the degree of freedom except for aperiodic CSI reporting setting that corresponds to reporting all links of one cell in use. As noted above in Table 20, there may also be an option involving no triggering of channel state reporting, in pre-configuration of a trigger field for which "000" or the like can be configured.

As described above, in order to trigger channel state reporting based on the CSI reporting setting, the base station may cause the terminal to perform aperiodic channel state reporting to the base station, via DCI by using the trigger fields shown in TABLEs 22, 23, and 24.

TABLE 22

| Value of CSI request field | Description |
|---|---|
| '000' | No aperiodic CSI report is triggered |
| '001' | Aperiodic CSI report is triggered for a set of CSI reporting setting(s) configured by higher layers for serving cell |
| '010' | Aperiodic CSI report is triggered for a $1^{st}$ set of CSI reporting setting(s) configured by higher layers |
| . . . | . . . |

TABLE 23

| Value of CSI request field | Description |
|---|---|
| '000' | Aperiodic CSI report is triggered for a set of CSI reporting setting(s) configured by higher layers for serving cell |
| '001' | Aperiodic CSI report is triggered for a $1^{st}$ set of CSI reporting setting(s) configured by higher layers |
| '010' | Aperiodic CSI report is triggered for a $2^{nd}$ set of CSI reporting setting(s) configured by higher layers |
| . . . | . . . |

TABLE 24

| Value of CSI request field | Description |
|---|---|
| '000' | Aperiodic CSI report is triggered for a $1^{st}$ set of CSI reporting setting(s) configured by higher layers |
| '001' | Aperiodic CSI report is triggered for a $2^{nd}$ set of CSI reporting setting(s) configured by higher layers |
| '010' | Aperiodic CSI report is triggered for a $3^{rd}$ set of CSI reporting setting(s) configured by higher layers |
| . . . | . . . |

In Table 22, the base station may perform triggering for the terminal by using the indication fields, so that aperiodic channel state reporting may not be triggered or so that all CSI reporting settings of a corresponding cell may be triggered, and from the bit "010" subsequent to "001", CSI reporting settings triggered for channel state reporting via a pre-RRC setting may be triggered as described above with respect to the trigger method 2. The trigger fields used in Table 23 exclude the case where no channel state reporting is triggered. In this case, there may be an option involving no triggering of channel state reporting in the pre-configuration of a trigger field for which "001" or the like can be configured. According to Table 24, flexibility may be provided in configuration of the base station, by increasing the degree of freedom except for aperiodic CSI reporting setting, which corresponds to reporting all CSI reporting settings of one cell in use. As noted above in Table 23, there may also be an option involving no triggering of channel state reporting in the pre-configuration of a trigger field for which "000" or the like can be configured.

The indication fields may be used to indirectly indicate an aperiodic CSI-RS for channel measurement and interference measurement.

Figure 16:
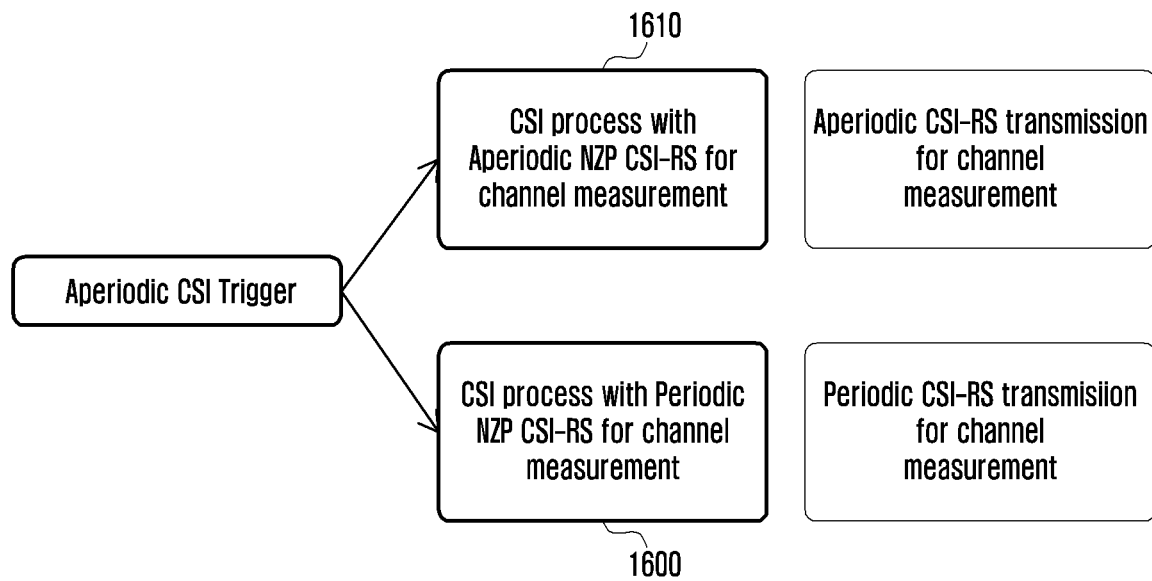
FIG. 16 is a diagram of an indirect indication of an aperiodic CSI-RS by using an aperiodic channel state report indication field, according to an embodiment.

FIG. 16 is a diagram of indirect indication of an aperiodic CSI-RS by using an aperiodic channel state report indication field, according to an embodiment.

In FIG. 16, a base station triggers channel state reporting by using a link. When a resource supported for channel measurement in a resource setting connected to a corresponding link corresponds to a periodic CSI-RS 1600, corresponding aperiodic channel state reporting may be performed based on a channel measured at an existing periodic CSI-RS resource. When the resource supported for channel measurement in the resource setting connected to the corresponding link corresponds to an aperiodic CSI-RS 1610, corresponding aperiodic channel state reporting may be performed based on a channel measured at an aperiodically configured CSI-RS resource. An aperiodic channel state report trigger and an aperiodic CSI-RS may always be transmitted in the same slot or subframe. As mentioned above, it is also possible that channel state reporting and aperiodic CSI-RS are triggered through a CSI reporting setting rather than a link.

In order to support the channel state reporting, resources for a desired signal and interference measurement may be configured for the terminal via the resource setting illustrated in FIG. 11. The following RRC parameters may be considered for resource setting, as shown in Table 25.

TABLE 25

| Parameter name | Description | Value range |
| --- | --- | --- |
| CSI-RS-ResourceConfig | CSI-RS resource configuration | |
| CSI-RS-ResourceConfigId | CSI-RS resource configuration ID | 0 . . . CSI-RS-ResourceMax − 1 |
| ResourceConfigType | Time domain behavior of resource configuration | aperiodic, semi-persistent, or periodic |
| CSI-RS-timeConfig | Contains periodicity and slot offset for periodic/semi-persistent CSI-RS | |
| NrofPorts | Number of ports | 1, 2, 4, 8, 12, 16, [24], 32 |
| CSI-RS-ResourceMapping | Include parameters to capture OFDM symbol and subcarrier occupancy of the CSI-RS resource within a slot | |
| CDMType | Includes parameters to capture CDM value (1, 2, 4, or 8), CDM pattern (freq only, time and freq, time only) | |
| CSI-RS-Density | Density of CSI-RS resource measured in RE/port/PRB | e.g., ½, 1, >1 |
| CSI-RS-FreqBand | Includes parameters to enable configuration of wideband and partial band CSI-RS | |
| Pc | Power offset of NZP CSI-RS RE to PDSCH RE | |
| ScramblingID | Scrambling ID | |

Based on the resource setting, beam measurement, reporting, and management may be supported in the NR. A large number of antennas, such as 1024 antennas, and a high frequency band, such as 30 GHz, are supported in NR MIMO. Wireless communication using a millimeter wave exhibits high linearity and high path loss due to the characteristics of a corresponding band. In order to overcome this problem, hybrid beamforming, in which RF and antenna-based analog beamforming and digital-precoding-based digital beamforming can be combined, is required.

Figure 17:
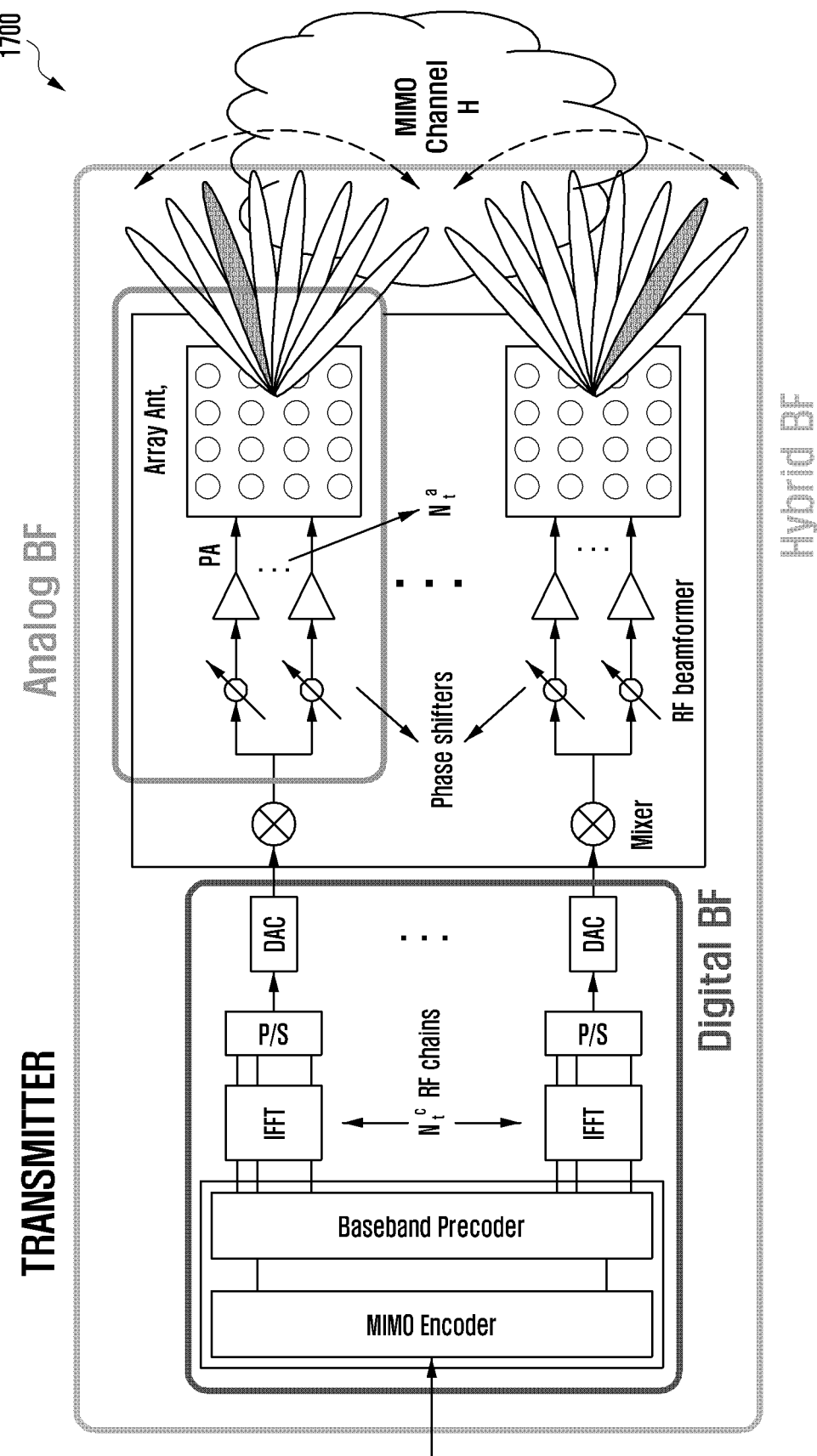
FIG. 17 is a diagram of a hybrid beamforming system supported in NR, according to an embodiment.

FIG. 17 is a diagram of a hybrid beamforming system 1700, according to an embodiment.

In FIG. 17, a base station and a terminal include an RF chain and a phase shifter for digital beamforming and analog beamforming. An analog beamforming scheme on a transmission side corresponds to a method of changing the phase of a signal transmitted from each antenna, via the phase shifter, thereby concentrating the corresponding signal in a specific direction, wherein the signal is transmitted from each antenna by using a plurality of antennas. To this end, an array antenna, in which a plurality of antenna elements are aggregated, can be used. When transmission beamforming is used, it is possible to increase the arrival distance of signal waves, and since signals are hardly transmitted in directions other than a corresponding direction, interference on other users can be considerably reduced. Similarly, a reception side may perform reception beamforming by using a reception array antenna, in which the sensitivity of reception signals entering in a corresponding direction is increased by concentrating the reception of radio waves in a specific direction, and excluding a signal entering in directions other than the corresponding direction from the reception signals, thereby blocking an interference signal.

Conversely, as a transmission frequency increases, the wavelength of a radio wave becomes shorter. For example, when antennas are formed at half-wave intervals, an array antenna may include more element antennas within an area of the same size. Therefore, a communication system operating at a high frequency band is well positioned to apply the beamforming technique because the communication system may acquire a relatively higher antenna gain in comparison with using the beamforming technique at a low frequency band.

In this beamforming technique, in order to obtain a higher antenna gain, hybrid beamforming is used, in which the hybrid beamforming combines digital precoding used to achieve a high data transmission rate effect in an existing multi-antenna system with the analog beamforming technique. When a beam is formed via analog beamforming, and one or more analog beams are formed, a signal is transmitted by employing digital precoding similar to that applied in existing multiple antennas in a baseband, so that a more reliable signal may be received or a higher system capacity may be expected. The disclosure proposes a method for, when a base station and a terminal support analog, digital, or hybrid beamforming, measuring the quality of a beam according to the beam switching capability of the base station and the terminal, and reporting and using corresponding information.

With respect to beamforming, it is important to select a direction optimized for the corresponding base station and terminal. In order to select an optimized beam direction, the base station and the terminal may support beam-sweeping by using a plurality of time and frequency resources.

Figure 18:
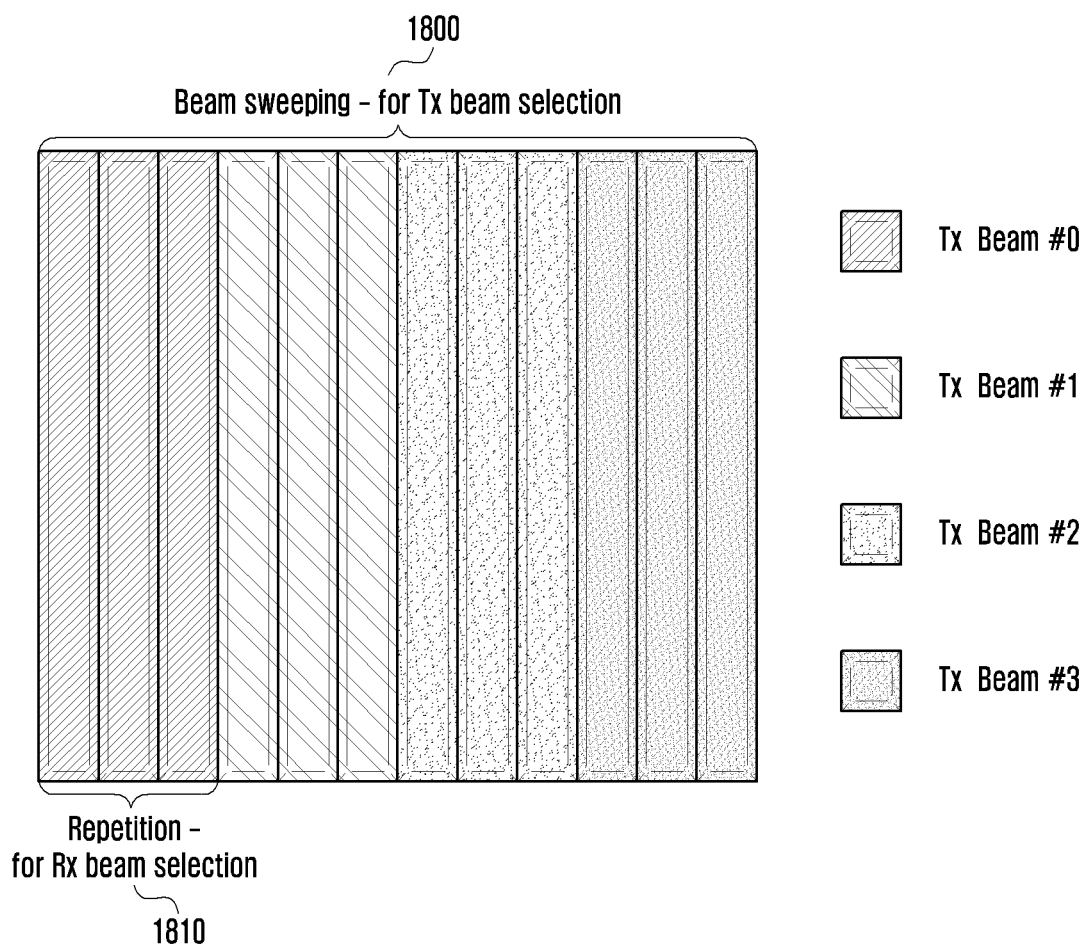
FIG. 18 is a diagram of a beam-sweeping operation of a terminal and a base station in time resources, according to an embodiment.

FIG. 18 is a diagram of a beam-sweeping operation of a terminal and a base station in time resources, according to an embodiment.

In FIG. 18, a terminal or a base station transmits a reference signal by using a different beam for a time resource in order to select a beam for the terminal or the base station. A base station or a terminal having received the reference signal may measure the quality of the corresponding reference signal based on a CSI of the reference signal, reference signal received power (RSRP), a reference signal received quality (RSRQ), etc., and may select one or multiple transmission or reception beams according to the corresponding result. In FIG. 17, a reference signal is transmitted based on a different beam via a different time resource. However, the same transmission scheme may be applied to frequency, cyclic shift, a code resource, etc. As shown in FIG. 18, a plurality of transmission beams 1800 may be transmitted for transmission beam-sweeping, and it is also possible to repeatedly apply one transmission beam and perform transmission 1810 for reception beam-sweeping.

A beam management operation, such as beam-sweeping, may also be performed based on periodic, semi-persistent, or aperiodic CSI-RS transmission and channel state reporting/beam reporting, and the channel state report framework (resource setting, CSI reporting setting, CSI measurement setting, links, etc.) depicted in FIGS. 11 to 16.

In supporting the channel state reporting or the beam reporting, for resource setting in the NR, a plurality of CSI-RS resources are configured into a CSI-RS resource set in order to transmit a plurality of beams for transmission beam-sweeping and to repeatedly transmit a single transmission beam for reception beam-sweeping, and whether each of the CSI-RS resources corresponds to an individual CSI-RS resource or an identical CSI-RS resource is repeated may be configured, and for this, the RRC setting parameters in Table 26 described below may be provided.

resource set supports the same beam, CSI-RS ResourceRepetitionConfig may be expressed as BeamRepetitionConfig, or the like.

In the configuration of CSI-RS resource repetition in the corresponding CSI-RS resource set configuration, only a 1-port CSI-RS resource or a 1- or 2-port CSI-RS resource may be configured as each CSI-RS resource. In the transmission beam-sweeping and the reception beam-sweeping mentioned in FIG. 18, the number of corresponding transmission beams may be large, such as 1024 transmission beams, and the number may become larger when considering the reception beam-sweeping. Therefore, the number of corresponding antenna, ports may be limited to 1 port or 2 ports in order to configure CSI-RS resources necessary for corresponding sweeping, so that the overhead necessary for reference signal transmission may be reduced and efficient beam management may be performed.

In addition, when the CSI-RS resource repetition is configured within the CSI-RS resource set, when OFDM symbols at which corresponding CSI-RS resources are transmitted are the same according to CSI-RS-ResourceMapping configuration of each of the CSI-RS resources, the CSI-RS resources may not be allowed for repetition configuration or the terminal may be configured to disregard the corresponding configuration; this is because it is difficult for the terminal to use the CSI-RS in the same OFDM symbol to measure the quality of a different reception beam, in sweeping a plurality of reception beams of the terminal.

In addition, when the CSI-RS resource is repeated, configurations other than CSI-RS-ResourceMapping configuration, which are ResourceConfigType, CSI-RS-timeConfig,

TABLE 26

| Parameter name | Description | Value range |
| --- | --- | --- |
| ResourceSetConfigList | Contains up to ResourceSetMax resource set configurations (ResourceSetConfig) | |
| ResourceSetConfig | Resource set configuration | |
| ResourceSetConfigId | Resource set configuration ID | 0 . . . ResourceSetMax − 1 |
| CSI-RS-ResourceConfigList | Contains up to CSI-RS-ResourcePerSetMax CSI-RS resource configurations (CSI-RS-ResourceConfig) | |
| CSI-RS ResourceRepetitionConfig | Configuration of CSI-RS resource repetition ON/OFF | |

In Table 26, ResourceSetConfigList enables the configuration of a plurality of CSI-RS resource sets. A plurality of CSI-RS resource sets may be configured, and individual CSI-RS resource sets are individually configured via ResourceSetConfig. ResourceSetConfig has ResourceSetConfigId, CSI-RS-ResourceConfigList, and CSI-RS ResourceRepetitionConfig configurations. ResourceSetConfigId may allow the configuration of an ID for a CSI-RS resource set configuration, and CSI-RS-ResourceConfigList may allow the configuration of IDs of CSI-RS resources configured into a corresponding CSI-RS resource set, based on the IDs of CSI-RS resources described in Table 25, so as to indicate the CSI-RS resource configured into the CSI-RS resource set. For CSI-RS resources configured into a corresponding CSI-RS resource set, CSI-RS ResourceRepetitionConfig may allow configuration of whether individual CSI-RS resources are transmitted based on a different beam for transmission beam-sweeping or individual CSI-RS resources support repetition of the same CSI-RS resource. In order to indicate whether the corresponding CSI-RS NrofPorts, CDMType, CSI-RS-Density, CSI-RS-FreqBand, $P_C$, and ScramblingID configurations, may not be allowed for a different configuration specific to a CSI-RS resource, or the terminal may be configured to disregard the corresponding configuration. The reason for this is that, when the terminal sweeps a plurality of reception beams of the terminal, when the densities of the CSI-RSs are different, a relative comparison of CQIs or RSRP for corresponding beam measurements may be difficult. When transmission occurs frequently at one CSI-RS resource while transmission occurs relatively infrequently at a different CSI-RS resource due to a difference in each configured CSI-RS resource period, it is difficult for the reception beam-sweeping required by the terminal to be completely performed. In addition, when boosting of corresponding CSI-RS power $P_C$ or the CSI-RS-FreqBand that is a transmission frequency band are configured differently for the same beam transmission, RSRP specific to a reception beam may vary, and the accuracy may be lowered even if the terminal corrects the RSRP.

Therefore, at CSI-RS resource repetition for corresponding reception beam-sweeping, in order to reduce the hardware implementation complexity of the terminal in the CSI-RS repetition configuration and to efficiently perform a terminal reception beam-sweeping operation, configuration of the CSI-RS resource included in the corresponding CSI-RS resource set may be limited. The method for limiting the configuration of the CSI-RS resource included in the resource set when CSI-RS resource repetition is configured may be as follows.

Resource setting restriction method 1: Reusing specific CSI-RS resource setting other than CSI-RS-ResourceMapping.

Resource setting restriction method 2: Repeatedly performing recognition when a plurality of identical CSI-RS resource IDs are configured.

A relative symbol offset required for CSI-RS-ResourceMapping may be additionally configured.

Resource setting restriction method 3: When repetition is configured, when the CSI-RS setting is not the same, disregarding the corresponding CSI-RS setting.

Resource setting restriction method 1 is a method of reusing the configuration of a first CSI-RS resource except for a variable parameter, such as CSI-RS-ResourceMapping. When corresponding repetition is configured, configuration of a specific CSI-RS resource, except for some parameters required to be configured differently for each resource, may be reused. The specific CSI-RS resource may be predefined as a specific resource (e.g., the first CSI-RS resource, etc.) in the standard, or a CSI-RS resource having a configuration used for repetition may be additionally indicated via RRC or MAC CE.

Resource setting restriction method 2 is a method for, when a plurality of identical CSI-RS resource IDs are configured, causing the configuration to be recognized as repetition. In order to use the same parameter, the same CSI-RS resource may be configured so as to provide notification of repetition of the same resource. Since the terminal may be able to identify via a corresponding ID whether repetition is performed, CSI-RS resource repetition transmission may be identified via the same CSI-RS resource ID configured to the CSI-RS resource set without an additional configuration (CSI-RS ResourceRepetitionConfig) field. In this case, the CSI-RS resource repetition transmission may be applied to all or part of the resource set. Also, since the CSI-RS resource used for repetition should not be transmitted at the same OFDM symbol as mentioned above, CSI-RS-ResourceMapping may be allowed for exceptional use, or a relative symbol offset required for repetition may be additionally configured.

Resource setting restriction method 3 is a method for, when repetition has been configured, disallowing or disregarding a corresponding CSI-RS setting when the CSI-RS setting is not the same. Since the same parameter should be used when repetition is configured, when repetition has been configured to a CSI-RS resource that does not use the same parameters in parameters other than some parameters allowing a different configuration, the terminal may determine that the corresponding configuration is wrong and may disregard the corresponding CSI-RS setting.

In the disclosure, descriptions have been made for an example in which a base station supports a transmission beam, while a terminal supports a reception beam. However, it is also possible that a base station supports a reception beam while a terminal supports a transmission beam, or that all of multiple terminals support both transmission and reception beams. Further, in the disclosure, descriptions have been made based on a CSI-RS, but embodiments of the disclosure may also be applicable to a sounding reference signal (SRS).

Figure 19:
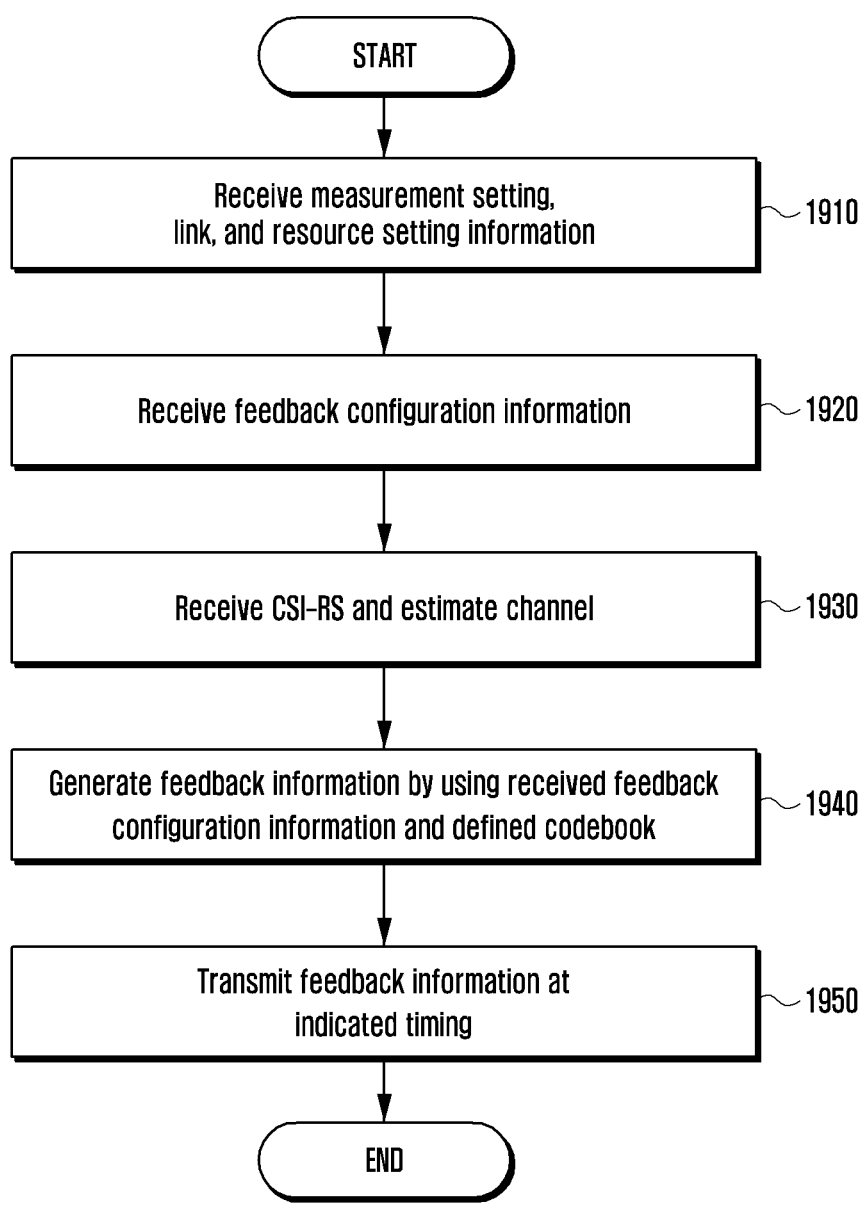
FIG. 19 is a flowchart of a method of the terminal, according to an embodiment.

FIG. 19 is a flowchart of a method of a terminal according to an embodiment.

Referring to FIG. 9, in step 1910, a terminal receives measurement-setting and resource-setting information. The information may include information on a reference signal for channel measurement. For example, a reference signal type, a number of ports of the reference signal, a codebook type, $N_1$ and $N_2$, i.e., the number of antennas for each dimension, $O_1$ and $O_2$, i.e., an oversampling factor for each dimension, one subframe config for transmission of a plurality of CSI-RSs and a plurality of resource configs for position configuration, codebook subset restriction-related information, CSI reporting-related information, a CSI-process index, a candidate number for timing indication between an aperiodic channel state report trigger and aperiodic channel state reporting, and/or transmission power information ($P_C$) may be included, and a terminal may identify at least one thereof.

In step 1920, the terminal may configure a piece of feedback configuration information via the CSI reporting setting used in a corresponding measurement setting. The information may include information on whether to report PMI/CQI, a period and offset, an RI period and offset, a CRI period and offset, a status of wideband/subband, a submode, a candidate number for timing indication between an aperiodic channel state report trigger and aperiodic channel state reporting, etc.

In step 1930, when a reference signal is received based on the corresponding information, the terminal estimates a channel between an antenna of a base station and a reception antenna of the terminal on the basis of the received reference signal.

In step 1940, based on the estimated channel, the terminal may generate feedback information, such as rank, PMI, and CQI, by using a received feedback configuration, and may select an optimum CRI on the basis thereof. Subsequently, in step 1950, the terminal transmits, to the base station, the feedback information at a feedback timing determined according to the feedback configuration of the base station or the aperiodic channel state report trigger, and the timing indication between the aperiodic channel state report trigger and the aperiodic channel state reporting, and completes a procedure of generating and reporting channel feedback.

Figure 20:
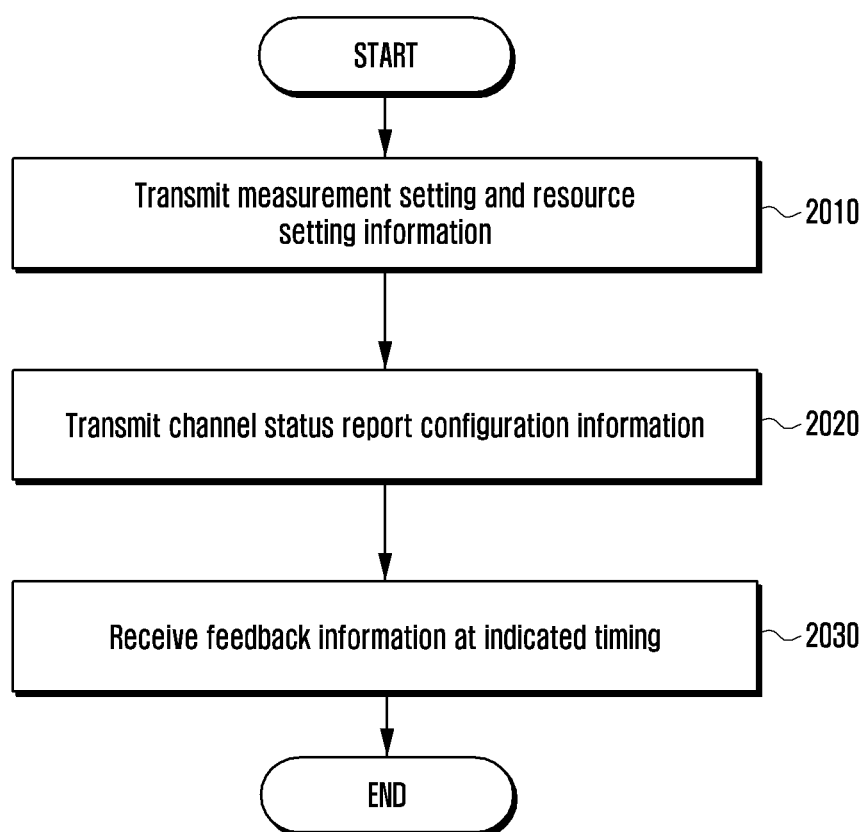
FIG. 20 is a flowchart of a method of the base station, according to an embodiment.

FIG. 20 is a flowchart of a method of a base station according to an embodiment.

Referring to FIG. 20, in step 2010, a base station transmits, to a terminal, a reference signal for channel measurement and configuration information for a CSI reporting setting. The configuration information may include a type of each reference signal, a time and frequency resource position, a service type, a support feedback type, and a measurement subset. The configuration information may include a number of ports for a reference signal for transmission of the reference signal, $N_1$ and $N_2$, i.e., the number of antennas for each dimension, $O_1$ and $O_2$, i.e., an oversampling factor for each dimension, one subframe config for transmission of a plurality of reference signals and a plurality of resource configs for position configuration, codebook subset restriction-related information, CSI reporting-related information, a CSI-process index, and/or $P_C$.

Subsequently, in step 2020, the base station transmits, to the terminal, feedback configuration information based on at least one CSI-RS. The corresponding information may include a PMI/CQI period and offset, an RI period and offset, a CRI period and offset, a status of wideband/subband, a submode, a candidate number for timing indication between an aperiodic channel state report trigger and aperiodic channel state reporting, etc. Subsequently, the base station transmits a configured CSI-RS to the terminal. The terminal estimates a channel for each antenna port, and estimates an additional channel with respect to virtual resources on the basis of the estimated channel. The terminal may determine feedback, generates a CRI, a PMI, an RI, and a CQI corresponding thereto, and transmit the same to the base station. In step 2030, the base station receives feedback information from the terminal at a determined timing and uses the same to determine the channel state between the terminal and the base station.

Figure 21:
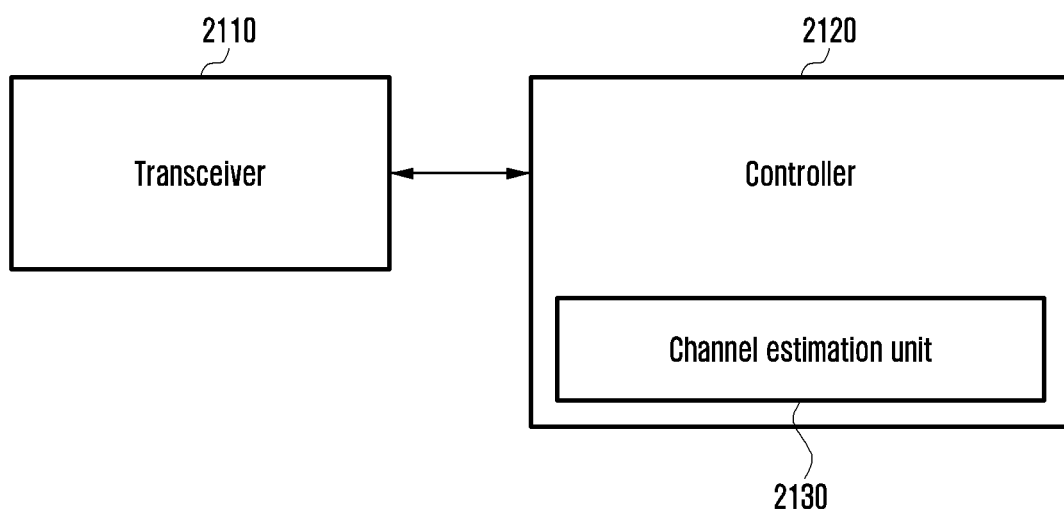
FIG. 21 is a diagram of a terminal according to an embodiment.

FIG. 21 is a diagram of a terminal, according to an embodiment.

Referring to FIG. 21, a terminal includes a transceiver 2110 and a controller 2120. The transceiver 2110 may transmit data to or receive data from the outside (e.g., a base station). The transceiver 2110 may transmit, to a base station, feedback information under the control of the controller 2120. The controller 2120 controls statuses and operations of all elements forming the terminal. Specifically, the controller 2120 generates feedback information based on the information assigned from the base station. Also, the controller 2120 controls the transceiver 2110 to transmit, to the base station, generated channel information according to timing information assigned from the base station. The controller 2120 may include a channel estimation unit 2130. The channel estimation unit 2130 determines the position of a corresponding resource in time and frequency resources via service and feedback information received from the base station, and identifies necessary feedback information via CSI-RS and feedback allocation information related thereto. A channel is estimated using the received CSI-RS based on the feedback information.

Although FIG. 21 has described an example in which the terminal is formed of the transceiver 2110 and the controller 2120, the disclosure may not be limited thereto, and may further include various elements based on a function executed in the terminal. For example, the terminal may include a display that displays the present status of the terminal, an input unit through which a signal for executing a function is input from a user, a storage unit that stores data generated in the terminal, or the like. Also, while it is illustrated that the channel estimation unit 2130 is included in the controller 2120, the channel estimation unit 2130 can be a component separate from the controller 2120. The controller 2120 may control the transceiver 2110 to receive configuration information associated with a reference signal resource, from the base station. The controller 2120 may measure the reference signal, and may control the transceiver 2110 to receive, from the base station, feedback configuration information for generating feedback information on the basis of a result of the measurement.

The controller 2120 may measure one or more reference signals received through the transceiver 2110, and may generate feedback information based on the feedback configuration information. The controller 2120 may control the transceiver 2110 to transmit, to the base station, the generated feedback information at a feedback timing based on the feedback configuration information. The controller 2120 may receive a CSI-RS from the base station, may generate feedback information based on the received CSI-RS, and may transmit the generated feedback information to the base station.

The controller 2120 may receive a CSI-RS from the base station, may generate feedback information on the basis of the received CSI-RS, and may transmit the generated feedback information to the base station. The controller 2120 may select one precoding matrix with respect to all antenna port groups of the base station. The controller 2120 may receive feedback configuration information from the base station, may receive a CSI-RS from the base station, may generate feedback information based on the received feedback configuration information and the received CSI-RS, and may transmit the generated feedback information to the base station.

Figure 22:
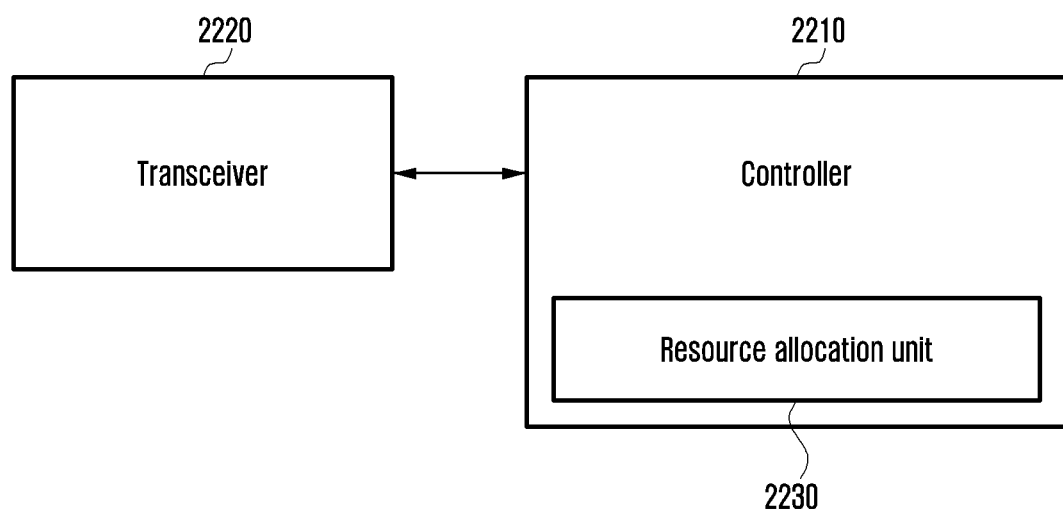
FIG. 22 is a diagram of a base station according to an embodiment.

FIG. 22 is a diagram of a base station, according to an embodiment.

Referring to FIG. 22, the base station includes a controller 2210 and a transceiver 2220. The controller 2210 controls statuses and operations of all elements forming the base station. The controller 2210 assigns a related configuration for a terminal to acquire resource information, allocates a CSI-RS resource for channel estimation to the terminal, and allocates a feedback resource and a feedback timing to the terminal. To this end, the controller 2210 may further include a resource allocation unit 2230. The controller 2210 may allocate a feedback configuration and a feedback timing to prevent collisions between feedback from multiple terminals, may receive configured feedback information at the corresponding timing, and may interpret the same. The transceiver 2220 may execute transmission and reception of data, a reference signal, and feedback information with the terminal. The transceiver 2220 may transmit a CSI-RS to the terminal, and may receive feedback associated with channel information from the terminal, through resources allocated under the control of the controller 2210. A reference signal is transmitted based on a CRI, a rank, a part of PMI information, a CQI, etc., which are obtained from channel state information transmitted by the terminal.

While it is illustrated that the resource allocation unit 2230 is included in the controller 2210, the resource allocation unit 2230 may be a component separate from the controller 2210. The controller 2210 may control the transceiver 2230 to transmit, to the terminal, configuration information associated with a reference signal, or may generate the reference signal. The controller 2210 may control the transceiver 2220 to transmit, to the terminal, feedback configuration information for generation of feedback information according to the result of the measurement. The controller 2210 may transmit the at least one reference signal to the terminal, and may control the transceiver 2220 to receive the feedback information transmitted from the terminal at a feedback timing according to the feedback configuration information. The controller 2210 may transmit the feedback configuration information to the terminal, may transmit a CSI-RS to the terminal, and may receive the feedback information generated based on the feedback configuration information and the CSI-RS from the terminal. The controller 2210 may transmit feedback configuration information corresponding to each antenna port group of the base station, as well as additional feedback configuration information based on a relationship between antenna port groups. The controller 2210 may transmit a CSI-RS beam formed based on the feedback information to the terminal, and may receive the feedback information generated based on the CSI-RS from the terminal.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for receiving a channel state information reference signal (CSI-RS) in a communication system, the method comprising:
 acquiring, by a user equipment (UE), from a base station, a configuration for a resource set including a resource set identifier, information for at least one CSI-RS resource, and repetition information,
  wherein a number of the at least one CSI-RS resource is up to a maximum number of CSI-RS resources per resource set, and
  wherein the repetition information is set as either on or off;
 acquiring, by the UE from, the base station, at least one CSI-RS resource configuration including a CSI-RS resource identifier, information for a number of CSI-RS ports, and information for an orthogonal frequency division multiplexing (OFDM) symbol for the CSI-RS,
  wherein the at least one CSI-RS resource configuration is associated with the at least one CSI-RS resource within the configuration for the resource set, and
  wherein in case that the repetition information is set as on,
   the at least one CSI-RS resource within the resource set is associated with a same number of ports, the same number of ports being 1 or 2,
   the at least one CSI-RS resource within the resource set is associated with different OFDM symbols, and
   the at least one CSI-RS resource within the resource set is associated with a same beam; and
 transmitting, to the base station, channel state information (CSI) based on the configuration for the resource set.

2. The method of claim 1, wherein the CSI includes an indicator of a selected CSI-RS resource and a power related to the selected CSI-RS resource, in case that the repetition information is set as off.

3. The method of claim 1, wherein information for a frequency band is further included in the at least one CSI-RS resource configuration, and
 wherein the information for the frequency band is for a wideband or a partial band CSI-RS.

4. The method of claim 1, wherein information for a code-division multiplexing (CDM) type is further included in the at least one CSI-RS resource configuration, and
 wherein the information for the CDM type indicates a CDM value as one of 1, 2, 4, or 8.

5. The method of claim 1, wherein information for a power offset of a physical downlink shared channel resource element (PDSCH RE) to a non-zero power CSI-RS resource element (NZP CSI-RS RE) and a scrambling identifier (ID) are further included in the at least one CSI-RS resource configuration.

6. A method for transmitting a channel state information reference signal (CSI-RS) in a communication system, the method comprising:
 transmitting, by a base station, to a user equipment (UE), at least one CSI-RS resource configuration including a CSI-RS resource identifier, information for a number of CSI-RS ports, and information for an orthogonal frequency division multiplexing (OFDM) symbol for the CSI-RS;
 transmitting, by the base station, to the UE, a configuration for a resource set including a resource set identifier, information for at least one CSI-RS resource within the resource set, and repetition information,
  wherein a number of the at least one CSI-RS resource is up to a maximum number of CSI-RS resources per resource set,
  wherein the repetition information is set as either on or off,
  wherein the at least one CSI-RS resource configuration is associated with the at least one CSI-RS resource within the configuration for the resource set, and
  wherein in case that the repetition information is set as on,
   the at least one CSI-RS resource within the resource set is associated with a same number of ports, the same number of ports being 1 or 2,
   the at least one CSI-RS resource within the resource set is associated with OFDM symbols, and
   the at least one CSI-RS resource within the resource set is associated with a same beam; and
 receiving, from the UE, channel state information (CSI) based on the configuration for the resource set.

7. The method of claim 6, wherein the at CSI includes an indicator of a selected CSI-RS resource and a power related to the selected CSI-RS resource, in case that the repetition information is set as off.

8. The method of claim 6, wherein information for a frequency band is further included in the at least one CSI-RS resource configuration, and
 wherein the information for the frequency band is for a wideband or a partial band CSI-RS.

9. The method of claim 6, wherein information for a code-division multiplexing (CDM) type is further included in the at least one CSI-RS resource configuration, and
 wherein the information for the CDM type indicates a CDM value as one of 1, 2, 4, or 8.

10. The method of claim 6, wherein information for a power offset of a physical downlink shared channel resource element (PDSCH RE) to a non-zero power CSI-RS resource element (NZP CSI-RS RE) and a scrambling identifier (ID) are further included in the at least one CSI-RS resource configuration.

11. A user equipment (UE) for receiving a channel state information reference signal (CSI-RS) in a communication system, the UE comprising:
 a transceiver; and
 a controller coupled with the transceiver and configured to:
  acquire, from a base station, a configuration for a resource set including a resource set identifier, information for at least one CSI-RS resource, and repetition information,
   wherein a number of the at least one CSI-RS resource is up to a maximum number of CSI-RS resources per resource set, and
   wherein the repetition information is set as either on or off,
  acquire, from the base station, at least one CSI-RS resource configuration including a CSI-RS resource identifier, information for a number of CSI-RS ports, and information for an orthogonal frequency division multiplexing (OFDM) symbol for the CSI-RS,
   wherein the at least one CSI-RS resource configuration is associated with the at least one CSI-RS resource within the configuration for the resource set, and
   wherein in case that the repetition information is set as on, the at least one CSI-RS resource within the resource set is associated with a same number of ports, the same number of ports being 1 or 2, the at least one CSI-RS resource within the resource set is associated with different OFDM symbols, and the at least one CSI-RS resource within the resource set is associated with a same beam, and transmit, to the base station, channel state information (CSI) based on the configuration for the resource set.

12. The UE of claim 11, wherein the CSI includes an indicator of a selected CSI-RS resource and a power related to the selected CSI-RS resource, in case that the repetition information is set as off.

13. The UE of claim 11, wherein information for a frequency band is further included in the at least one CSI-RS resource configuration, and wherein the information for the frequency band is for a wideband or a partial band CSI-RS.

14. The UE of claim 11, wherein information for a code-division multiplexing (CDM) type is further included in the at least one CSI-RS resource configuration, and wherein the information for the CDM type indicates a CDM value as one of 1, 2, 4, or 8.

15. The UE of claim 11, wherein information for a power offset of a physical downlink shared channel resource element (PDSCH RE) to a non-zero power CSI-RS resource element (NZP CSI-RS RE), and a scrambling identifier (ID) are further included in the at least one CSI-RS resource configuration.

16. A base station for transmitting a channel state information reference signal (CSI-RS) in a communication system, the base station comprising:

a transceiver; and a controller coupled with the transceiver and configured to:

transmit, to a user equipment (UE), at least one CSI-RS resource configuration including a CSI-RS resource identifier, information for a number of CSI-RS ports, and information for an orthogonal frequency division multiplexing (OFDM) symbol for the CSI-RS, transmit, to the UE, a configuration for a resource set including a resource set identifier, information for at least one CSI-RS resource within the resource set, and repetition information, wherein a number of the at least one CSI-RS resource is up to a maximum number of CSI-RS resources per resource set, wherein the repetition information is set as either on or off, wherein the at least one CSI-RS resource configuration is associated with the at least one CSI-RS resource within the configuration for the resource set, and wherein in case that the repetition information is set as on, the at least one CSI-RS resource within the resource set is associated with a same number of ports, the same number of ports being 1 or 2, the at least one CSI-RS resource within the resource set is associated with different OFDM symbols, and the at least one CSI-RS resource within the resource set is associated with a same beam, and receive, from the UE, channel state information (CSI) based on the configuration for the resource set.

17. The base station of claim 16, wherein the CR includes an indicator of a selected CSI-RS resource and a power related to the selected CSI-RS resource, in case that the repetition information is set as off.

18. The base station of claim 16, wherein information for a frequency band is further included in the at least one CSI-RS resource configuration, and wherein the information for the frequency band is for a wideband or a partial band CSI-RS.

19. The base station of claim 16, wherein information for a code-division multiplexing (CDM) type is further included in the at least one CSI-RS resource configuration, and wherein the information for the CDM type indicates a CDM value as one of 1, 2, 4, or 8.

20. The base station of claim 16, wherein information for a power offset of a physical downlink shared channel resource element (PDSCH RE) to a non-zero power CSI-RS resource element (NZP CSI-RS RE) and a scrambling identifier (ID) are further included in the at least one CSI-RS resource configuration.

* * * * *